United States Patent
Azmoon et al.

(10) Patent No.: US 11,150,784 B1
(45) Date of Patent: Oct. 19, 2021

(54) USER INTERFACE ELEMENTS FOR CONTROLLING MENU DISPLAYS

(71) Applicant: ServiceNow, Inc., Santa Clara, CA (US)

(72) Inventors: Troy Azmoon, San Diego, CA (US); Aaron Wade, San Diego, CA (US); Rita Maria Castillo, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/028,359

(22) Filed: Sep. 22, 2020

(51) Int. Cl.
*G06F 3/0482* (2013.01)
*G06F 3/0484* (2013.01)
(Continued)

(52) U.S. Cl.
CPC .......... *G06F 3/0482* (2013.01); *G06F 3/0485* (2013.01); *G06F 3/04845* (2013.01);
(Continued)

(58) Field of Classification Search
CPC combination set(s) only.
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

Matt Klein, How to Add, Remove, and Customize Tiles on the Windows 10 Start Menu, How-To Geek, Last Updated on Jul. 10, 2017, 8 Pages, Available at https://www.howtogeek.com/223254/how-to-add-remove-and-customize-tiles-on-the-windows-10-start-menu/.

*Primary Examiner* — Hien L Duong
(74) *Attorney, Agent, or Firm* — McDonnell Boehnen Hulbert & Berghoff LLP

(57) ABSTRACT

A system includes a processor configured to perform operations, including receiving a request for a graphical user interface (GUI). The operations also include, in response to the request, generating a representation of the GUI to include navigational components and a fixed panel component, where the navigational components are positioned at predetermined locations within the GUI. A particular navigational component is configured to, in response to selection thereof, cause display of a corresponding plurality of child components arranged according to a corresponding predetermined hierarchy. The fixed panel component is positioned at a further predetermined location within the GUI and configured to, in response to a repositioning of the particular navigational component from its corresponding predetermined location to the fixed panel component, display the corresponding plurality of child components as a hierarchical list based on the corresponding predetermined hierarchy. The operations further include transmitting the representation of the GUI.

20 Claims, 15 Drawing Sheets

(51) Int. Cl.
*H04L 29/08* (2006.01)
*G06F 9/451* (2018.01)
*G06F 9/54* (2006.01)
*G06F 3/0485* (2013.01)

(52) U.S. Cl.
CPC .............. *G06F 9/452* (2018.02); *G06F 9/547* (2013.01); *H04L 67/34* (2013.01)

(56) References Cited

U.S. PATENT DOCUMENTS

| | | | |
|---|---|---|---|
| 5,237,518 A | 8/1993 | Sztipanovits et al. | |
| 5,261,097 A | 11/1993 | Saxon | |
| 5,265,252 A | 11/1993 | Rawson, III et al. | |
| 5,347,626 A * | 9/1994 | Hoeber | G06F 3/0481 |
| | | | 715/840 |
| 5,367,685 A | 11/1994 | Gosling | |
| 5,390,297 A | 2/1995 | Barber et al. | |
| 5,442,791 A | 8/1995 | Wrabetz et al. | |
| 5,452,415 A | 9/1995 | Hotka | |
| 5,522,042 A | 5/1996 | Fee et al. | |
| 5,533,116 A | 7/1996 | Vesterinen | |
| 5,655,081 A | 8/1997 | Bonnell et al. | |
| 5,659,736 A | 8/1997 | Hasegawa et al. | |
| 5,671,412 A | 9/1997 | Christiano | |
| 5,696,701 A | 12/1997 | Burgess et al. | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke et al. | |
| 5,887,139 A | 3/1999 | Madison, Jr. et al. | |
| 5,909,217 A | 6/1999 | Bereiter | |
| 5,937,165 A | 8/1999 | Schwaller et al. | |
| 5,949,976 A | 9/1999 | Chappelle | |
| 5,978,594 A | 11/1999 | Bonnell et al. | |
| 6,021,437 A | 2/2000 | Chen et al. | |
| 6,041,347 A | 3/2000 | Harsham et al. | |
| 6,088,717 A | 7/2000 | Reed et al. | |
| 6,101,500 A | 8/2000 | Lau | |
| 6,128,016 A | 10/2000 | Coelho et al. | |
| 6,131,118 A | 10/2000 | Stupek, Jr. et al. | |
| 6,134,581 A | 10/2000 | Ismael et al. | |
| 6,138,122 A | 10/2000 | Smith et al. | |
| 6,148,335 A | 11/2000 | Haggard et al. | |
| 6,166,732 A | 12/2000 | Mitchell et al. | |
| 6,167,448 A | 12/2000 | Hemphill et al. | |
| 6,175,866 B1 | 1/2001 | Holloway et al. | |
| 6,175,878 B1 | 1/2001 | Seaman et al. | |
| 6,260,050 B1 | 7/2001 | Yost et al. | |
| 6,263,457 B1 | 7/2001 | Anderson et al. | |
| 6,272,150 B1 | 8/2001 | Hrastar et al. | |
| 6,336,138 B1 | 1/2002 | Caswell et al. | |
| 6,363,421 B2 | 3/2002 | Barker et al. | |
| 6,393,386 B1 | 5/2002 | Zager et al. | |
| 6,397,245 B1 | 5/2002 | Johnson, II et al. | |
| 6,434,626 B1 | 8/2002 | Prakash et al. | |
| 6,438,592 B1 | 8/2002 | Killian | |
| 6,456,306 B1 | 9/2002 | Chin et al. | |
| 6,466,932 B1 | 10/2002 | Dennis et al. | |
| 6,487,590 B1 | 11/2002 | Foley et al. | |
| 6,505,248 B1 | 1/2003 | Casper et al. | |
| 6,526,442 B1 | 2/2003 | Stupek, Jr. et al. | |
| 6,621,823 B1 | 9/2003 | Mellquist et al. | |
| 6,707,795 B1 | 3/2004 | Noorhosseini et al. | |
| 6,742,015 B1 | 5/2004 | Bowman-Amuah | |
| 6,763,380 B1 | 7/2004 | Mayton et al. | |
| 6,816,898 B1 | 11/2004 | Scarpelli et al. | |
| 6,895,586 B1 | 5/2005 | Brasher et al. | |
| 6,948,175 B1 | 9/2005 | Fong et al. | |
| 6,985,901 B1 | 1/2006 | Sachse et al. | |
| 7,003,564 B2 | 2/2006 | Greuel et al. | |
| 7,028,228 B1 | 4/2006 | Lovy et al. | |
| 7,043,537 B1 | 5/2006 | Pratt | |
| 7,043,661 B2 | 5/2006 | Valadarsky et al. | |
| 7,062,683 B2 | 6/2006 | Warpenburg et al. | |
| 7,096,459 B2 | 8/2006 | Keller et al. | |
| 7,146,574 B2 | 12/2006 | Goldthwaite et al. | |
| 7,197,466 B1 | 3/2007 | Peterson et al. | |
| 7,215,360 B2 | 5/2007 | Gupta | |
| 7,216,304 B1 | 5/2007 | Gourdol et al. | |
| 7,222,147 B1 | 5/2007 | Black et al. | |
| 7,281,170 B2 | 10/2007 | Taylor et al. | |
| 7,412,502 B2 | 8/2008 | Fearn et al. | |
| 7,505,872 B2 | 3/2009 | Keller et al. | |
| 7,593,013 B2 | 9/2009 | Agutter et al. | |
| 7,596,716 B2 | 9/2009 | Frost et al. | |
| 7,617,073 B2 | 11/2009 | Trinon et al. | |
| 7,660,731 B2 | 2/2010 | Chaddha et al. | |
| 7,676,294 B2 | 3/2010 | Baier et al. | |
| 7,676,437 B2 | 3/2010 | Satkunanathan et al. | |
| 7,840,490 B1 | 11/2010 | Sellers et al. | |
| 7,877,783 B1 | 1/2011 | Cline et al. | |
| 7,890,869 B1 | 2/2011 | Mayer et al. | |
| 7,966,398 B2 | 6/2011 | Wiles, Jr. | |
| 8,060,396 B1 | 11/2011 | Bessler et al. | |
| 8,196,210 B2 | 6/2012 | Sterin | |
| 8,321,948 B2 | 11/2012 | Robinson et al. | |
| 8,407,669 B2 | 3/2013 | Yee et al. | |
| 8,554,750 B2 | 10/2013 | Rangarajan et al. | |
| 8,595,647 B2 | 11/2013 | Sabin et al. | |
| 8,620,818 B2 | 12/2013 | Hughes et al. | |
| 8,646,093 B2 | 2/2014 | Myers et al. | |
| 8,674,992 B2 | 3/2014 | Poston et al. | |
| 8,725,647 B2 | 5/2014 | Disciascio et al. | |
| 9,053,460 B2 | 6/2015 | Gilbert et al. | |
| 2002/0116340 A1 | 8/2002 | Hellberg et al. | |
| 2002/0133584 A1 | 9/2002 | Greuel et al. | |
| 2002/0158969 A1 | 10/2002 | Gupta | |
| 2003/0118087 A1 | 6/2003 | Goldthwaite et al. | |
| 2003/0200293 A1 | 10/2003 | Fearn et al. | |
| 2004/0237051 A1 * | 11/2004 | Clauson | G06F 3/0482 |
| | | | 715/825 |
| 2005/0015217 A1 | 1/2005 | Weidl et al. | |
| 2005/0091356 A1 | 4/2005 | Izzo | |
| 2006/0026453 A1 | 2/2006 | Frost et al. | |
| 2006/0095461 A1 | 5/2006 | Raymond | |
| 2006/0179058 A1 | 8/2006 | Bram et al. | |
| 2006/0242557 A1 * | 10/2006 | Nortis, III | G06F 40/14 |
| | | | 715/234 |
| 2006/0293942 A1 | 12/2006 | Chaddha et al. | |
| 2007/0033279 A1 | 2/2007 | Battat et al. | |
| 2007/0188494 A1 | 8/2007 | Agutter et al. | |
| 2007/0288389 A1 | 12/2007 | Vaughan et al. | |
| 2008/0034314 A1 * | 2/2008 | Louch | G06F 3/0481 |
| | | | 715/778 |
| 2008/0133289 A1 | 6/2008 | Armour et al. | |
| 2008/0148253 A1 | 6/2008 | Badwe et al. | |
| 2008/0319779 A1 | 12/2008 | Hughes et al. | |
| 2009/0088875 A1 | 4/2009 | Baier et al. | |
| 2009/0204928 A1 * | 8/2009 | Kallio | G06F 3/0481 |
| | | | 715/799 |
| 2009/0228824 A1 * | 9/2009 | Forstall | G06F 3/0482 |
| | | | 715/779 |
| 2009/0228984 A1 | 9/2009 | Sterin | |
| 2010/0110932 A1 | 5/2010 | Doran et al. | |
| 2012/0227000 A1 * | 9/2012 | McCoy | G06F 3/0482 |
| | | | 715/762 |
| 2015/0378521 A1 * | 12/2015 | Wang | G06F 3/0482 |
| | | | 715/841 |
| 2016/0275189 A1 * | 9/2016 | Narayanan | G06F 3/0481 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner

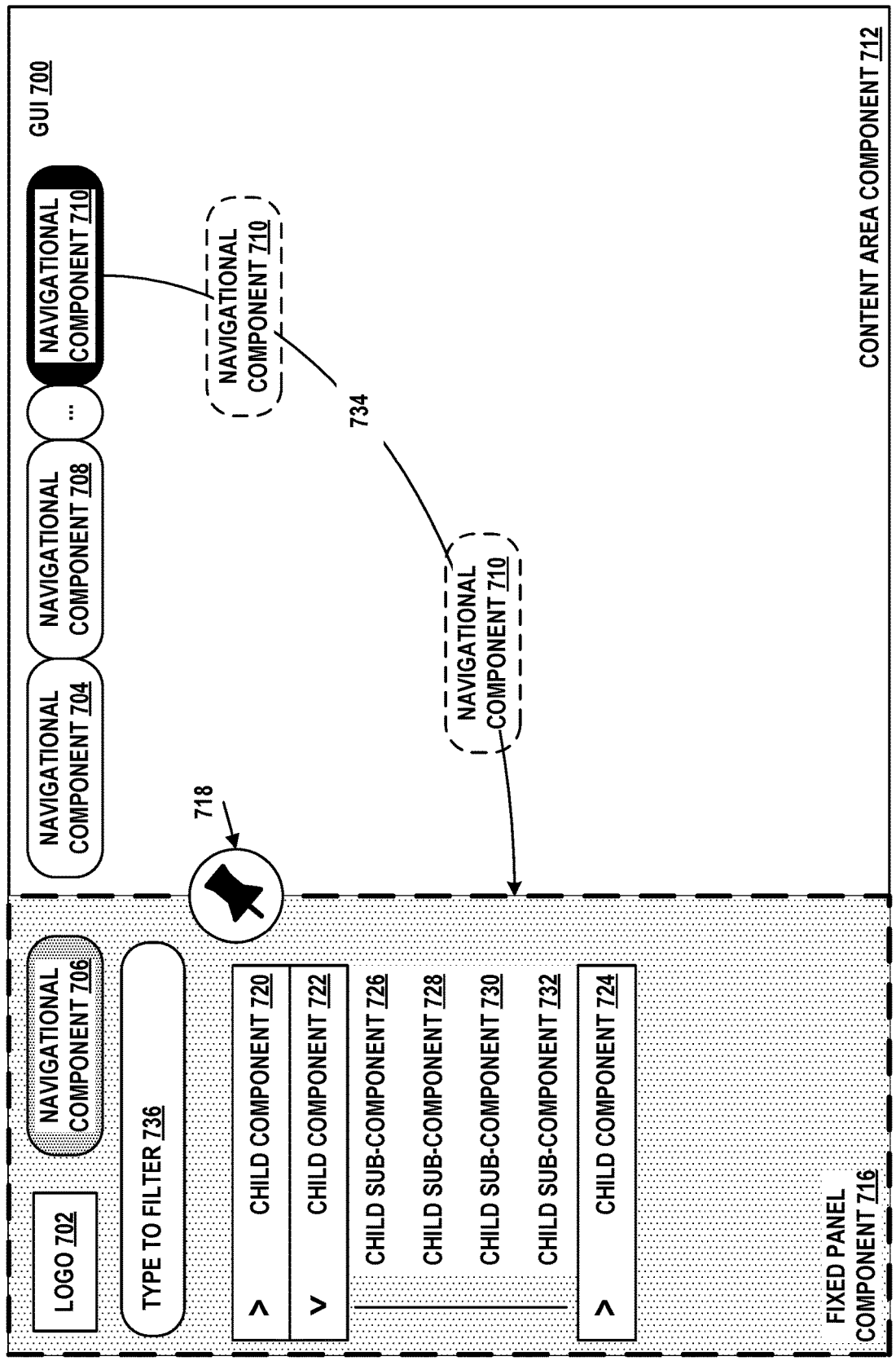

USER INTERFACE ELEMENTS FOR CONTROLLING MENU DISPLAYS

BACKGROUND

A graphical user interface (GUI) may facilitate interaction between a user and a computing device. A GUI may include a plurality of components arranged account to a layout. The GUI may allow a user to interact with a software application, a webpage, a file, and/or other resources using graphical icons, rather than text-based entries. Some of the graphical icons may be visually representative of the resources to which they correspond to further facilitate the interaction.

SUMMARY

A GUI may include a plurality of navigational components, such as tabs or icons, that facilitate navigation through the GUI. Specifically, each navigational component of the plurality of navigational components may be associated with a corresponding plurality of child components. For example, a "favorites" navigational component may include, as its child components, resources with which a particular user interacts relatively frequently. Thus, in some cases, the corresponding set of child components of a particular navigational component may vary over time based on user behavior or other contextual factors. In another example, a "workspaces" navigational component may include, as its child components, resources that the particular user utilizes and/or monitors as part of the particular user's position/role within a managed network. Thus, the corresponding set of child components of a particular navigational component could at least initially be predetermined by the user and/or an administrator, among other possibilities.

Each set of child components may be organized according to a corresponding hierarchy, which may indicate dependencies among the corresponding child components. For example, a first plurality of child-sub components may depend from a first child component, while a second plurality of child sub-components may depend from a second child component, and so on. In some cases, the hierarchy may be a flat hierarchy, where the child components are at the same level and do not depend from one another.

The child components of each navigational component may be displayed by way of an overlay panel component of the GUI and/or a fixed panel component of the GUI. The overlay panel component of the GUI may be disposed in a first vertical layer (e.g., a topmost layer) of the GUI, and may thus occlude other components of the GUI when displayed. When a particular navigational component is selected, the overlay panel component may be configured to display the child components thereof according to the corresponding hierarchy and the corresponding visual format associated with each child component.

In some cases, by displaying each child component in accordance with the corresponding visual format, each respective child component may be able to convey information that, for example, summarizes aspects of the underlying resource represented by the respective child component. For example, when the underlying resource associated with a particular child component is a graph, the visual format may indicate that the particular child component is to be a "sparkline" version of the graph that summarizes the overall trend of the graph. In other examples, the visual format may indicate that a child component is to be a card, a list item, and/or a table, among other possibilities. Further, the visual format may define a size, color, font size, and/or other visual properties of the corresponding child component that specify a visual pattern associated with the corresponding child component. The visual pattern may be consistent across different generations of the GUI over time, and may thus make it easier for a user to find the component within the GUI. Thus, the overlay panel may provide a visually-rich representation of the child components that, in some cases, provides an overview/summary of the respective state associated with each child component.

When a particular child component is selected, the overlay panel may be hidden, and the underlying resource may be displayed as part of a content area component, which may be disposed in a different layer of the GUI than the overlay panel component (e.g., a bottommost layer). The content area may provide a more complete representation of the underlying resource, rather than a summary of one or more aspects of the underlying resource. For example, the content area may provide a software application, while the component associated with this software application might only display the name of the software application and one or more notifications generated by the software application. In order to select another child component, the user may again select the particular navigational component, resulting in display of the overlay panel component, from which the other child component may be selected.

On the other hand, the fixed panel component may be affixed beside the content area component, thus allowing the user to quickly switch between various child components and display the underlying resources within the content area component. Thus, the fixed panel component may be disposed in the same layer of the GUI as the content area component (e.g., the bottommost layer). Further, the fixed panel component may be configured to display the child components of the particular navigation component as a hierarchical list that reflects the corresponding hierarchy of the child components. However, the fixed panel component may be configured to display the hierarchical list independently of the respective visual formats of the child components. Thus, the hierarchical list may offer a more condensed, concise, and/or standardized representation of the child components, allowing the child components to fit in the fixed panel component alongside the content area component. As the user switches between different child components, the fixed panel component may continue to be displayed, thus allowing the user to rapidly switch between displaying, within the content area display, the resources associated with different child components. Accordingly, the fixed panel component may offer greater maneuverability then the overlay panel component, while the overlay panel component may offer a richer visual experience than the fixed panel component.

The GUI may be configured to allow the user to switch between the overlay panel component and the fixed panel component by way of a pin button. Specifically, when the user selects a navigational component, the pin button may be displayed in an "unpinned" conformation as part of the overlay panel component. Selection of the pin button may trigger a hiding of the overlay panel component and a display of the fixed panel component. The fixed panel component may display the same child components as were displayed by the overlay panel, albeit as a standardized hierarchical list, rather than in accordance with the respective visual formats of the child components. The fixed panel component may display the pin button in a "pinned" conformation. Thus, when the pinned button is selected as part of the fixed panel component, the fixed panel component may be hidden, and the overlay panel component may be displayed to replace the fixed panel component.

The contents of the overlay panel may be changed by selecting a different navigational component. That is, when the overlay panel component displays the corresponding child components of a first navigational component, selection of a second navigational component may cause the overlay panel component to instead display the corresponding child components of the second navigational component. On the other hand, the contents of the fixed panel component may be changed by repositioning the navigational components to the fixed panel component. That is, when the fixed panel component displays the corresponding child components of the first navigational component, repositioning (e.g., dragging) of the second navigational component may cause the fixed panel component to instead display the corresponding child components of the second navigational component.

Thus, both the overlay panel component and the fixed panel component may allow for interaction with the corresponding child components of each navigational component, albeit in different ways. Accordingly, by using the pin button, the user may be able to select the component (i.e., overlay panel or fixed panel) that is better suited to the user's intended task and/or other user-specific preferences or contexts.

Accordingly, a first example embodiment may involve receiving, from a client device, a request for a GUI. Persistent storage may contain definitions of a fixed panel component, a plurality of navigational components, and respective pluralities of child components for the navigational components. The first example embodiment may also involve, in response to the request, obtaining the definitions from the persistent storage and generating a representation of the GUI to include the plurality of navigational components and the fixed panel component. The plurality of navigational components may be positioned at predetermined locations within the GUI. A particular navigational component may be configured to, in response to selection thereof, cause display of a corresponding plurality of child components arranged according to a corresponding predetermined hierarchy. The fixed panel component may be positioned at a further predetermined location within the GUI and may be configured to, in response to a repositioning of the particular navigational component from its corresponding predetermined location within the GUI to the fixed panel component, display the corresponding plurality of child components as a hierarchical list based on the corresponding predetermined hierarchy. The first example embodiment may further involve transmitting, to the client device, the representation of the GUI.

In a second example embodiment, a system may include persistent storage containing definitions of a fixed panel component, a plurality of navigational components, and respective pluralities of child components for the navigational components. The system may also include one or more processors configured to perform operations. The operations may include receiving, from a client device, a request for a GUI. The operations may also include, in response to the request, obtaining the definitions from the persistent storage and generating a representation of the GUI to include the plurality of navigational components and the fixed panel component. The plurality of navigational components may be positioned at predetermined locations within the GUI. A particular navigational component may be configured to, in response to selection thereof, cause display of a corresponding plurality of child components arranged according to a corresponding predetermined hierarchy. The fixed panel component may be positioned at a further predetermined location within the GUI and may be configured to, in response to a repositioning of the particular navigational component from its corresponding predetermined location within the GUI to the fixed panel component, display the corresponding plurality of child components as a hierarchical list based on the corresponding predetermined hierarchy. The operations may further include transmitting, to the client device, the representation of the GUI.

In a third example embodiment, an article of manufacture may include a non-transitory computer-readable medium, having stored thereon program instructions that, upon execution by a computing system, cause the computing system to perform operations in accordance with the first example embodiment and/or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment and/or the second example embodiment.

In a fifth example embodiment, a system may include various means for carrying out each of the operations of the first example embodiment and/or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 7A, 7B, 7C, 7D, and 7E illustrate aspects of a graphical user interface, in accordance with example embodiments.

DETAILED DESCRIPTION

Figure 1:
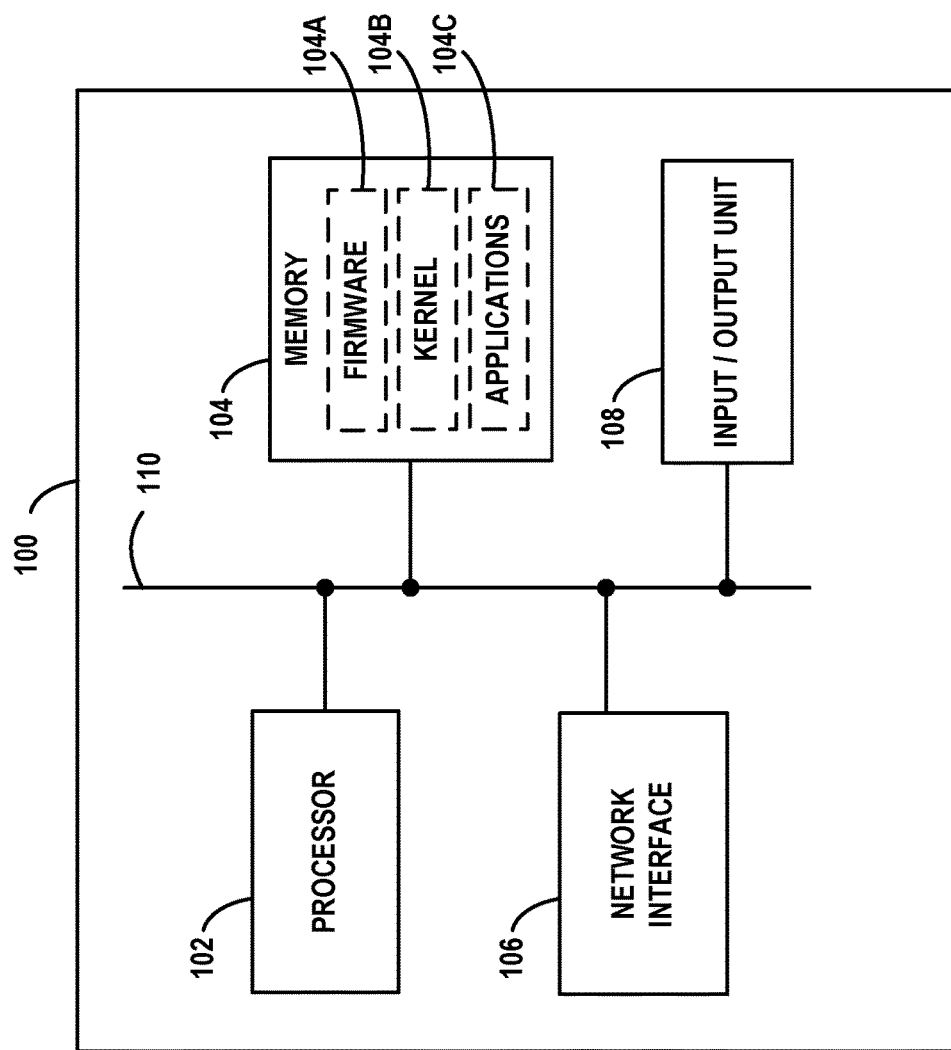
FIG. 1 illustrates a schematic drawing of a computing device, in accordance with example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
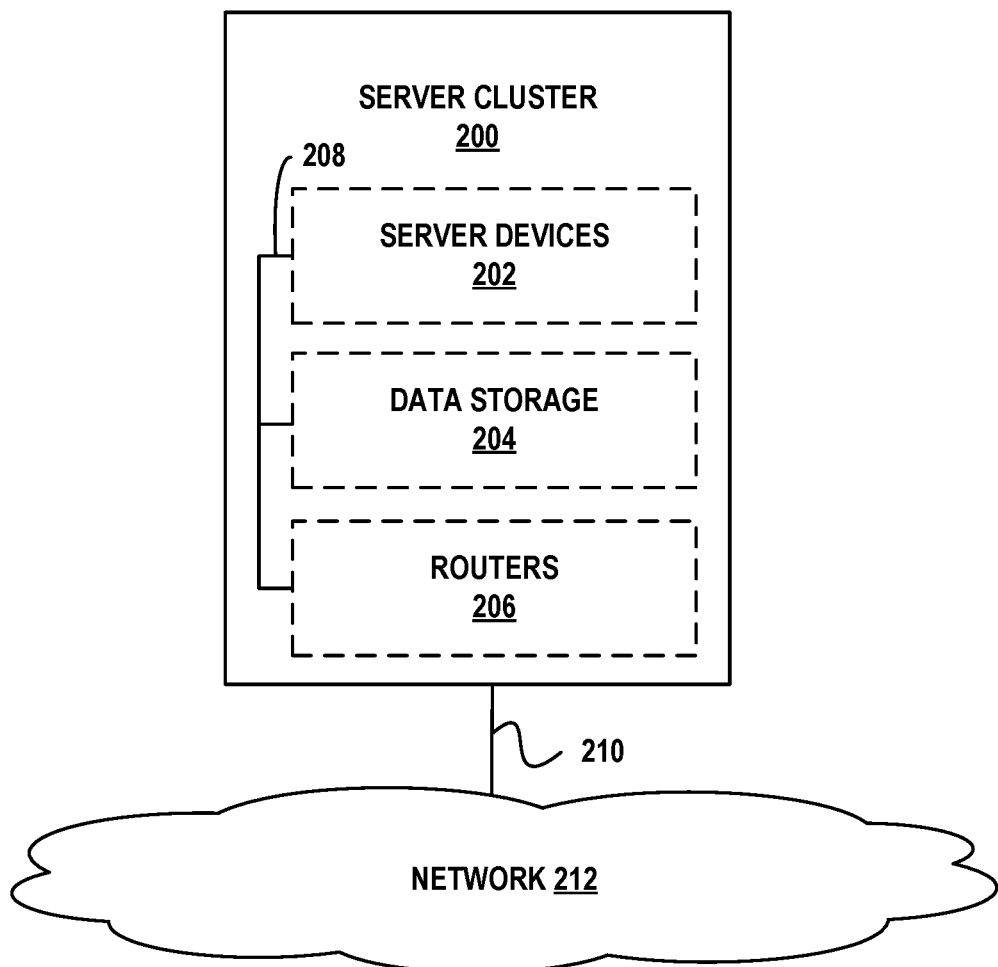
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
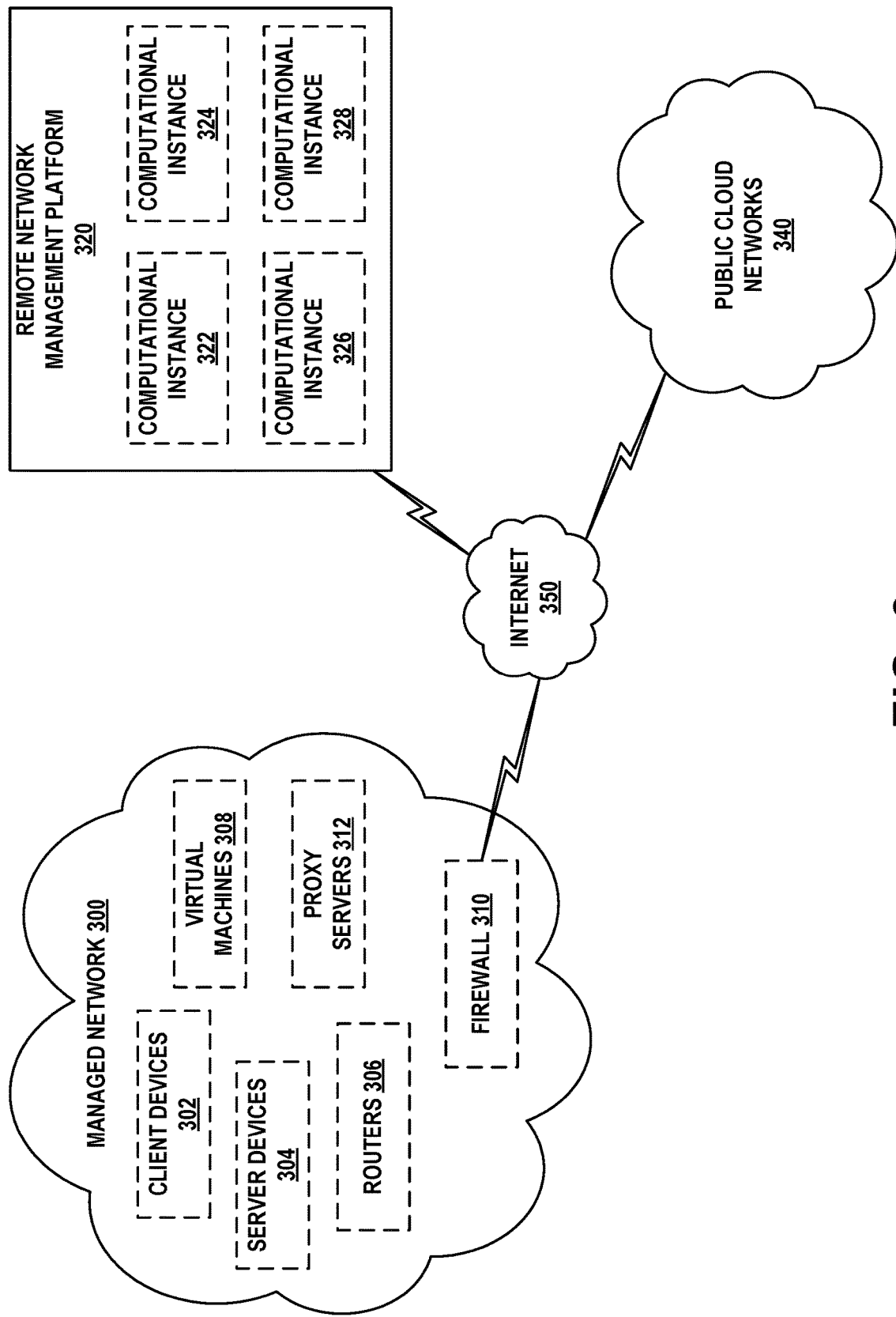
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
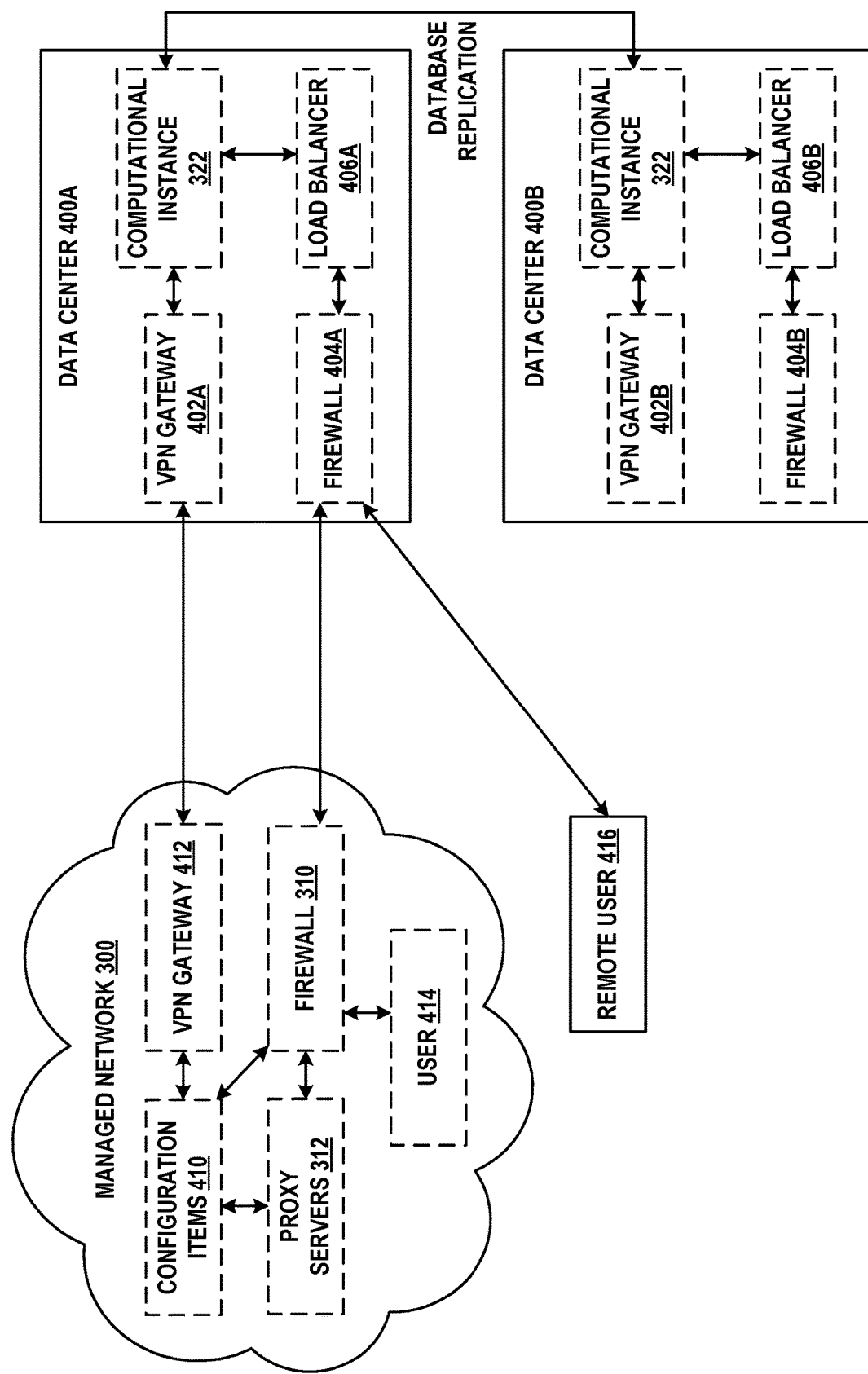
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
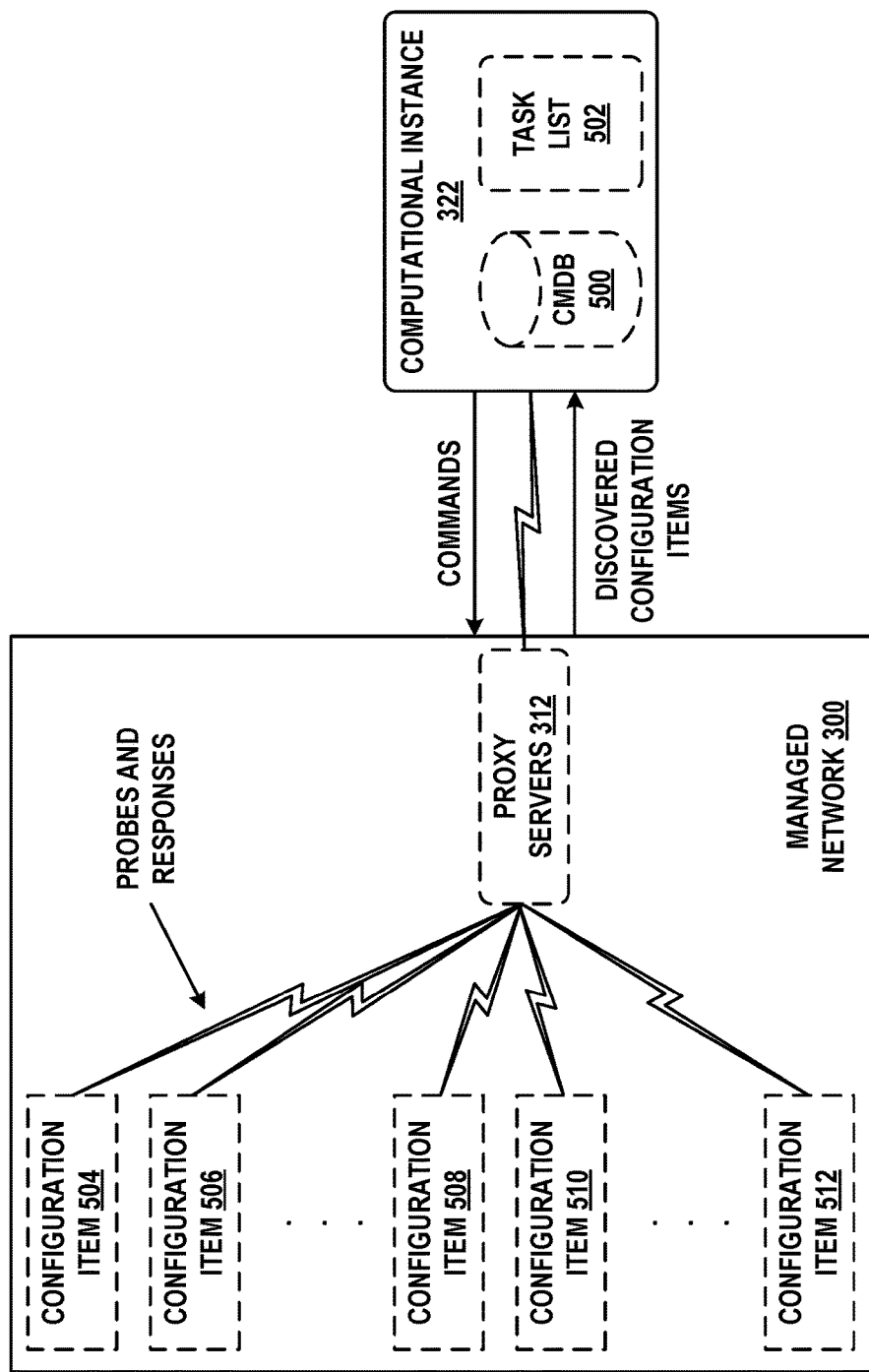
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this determination, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
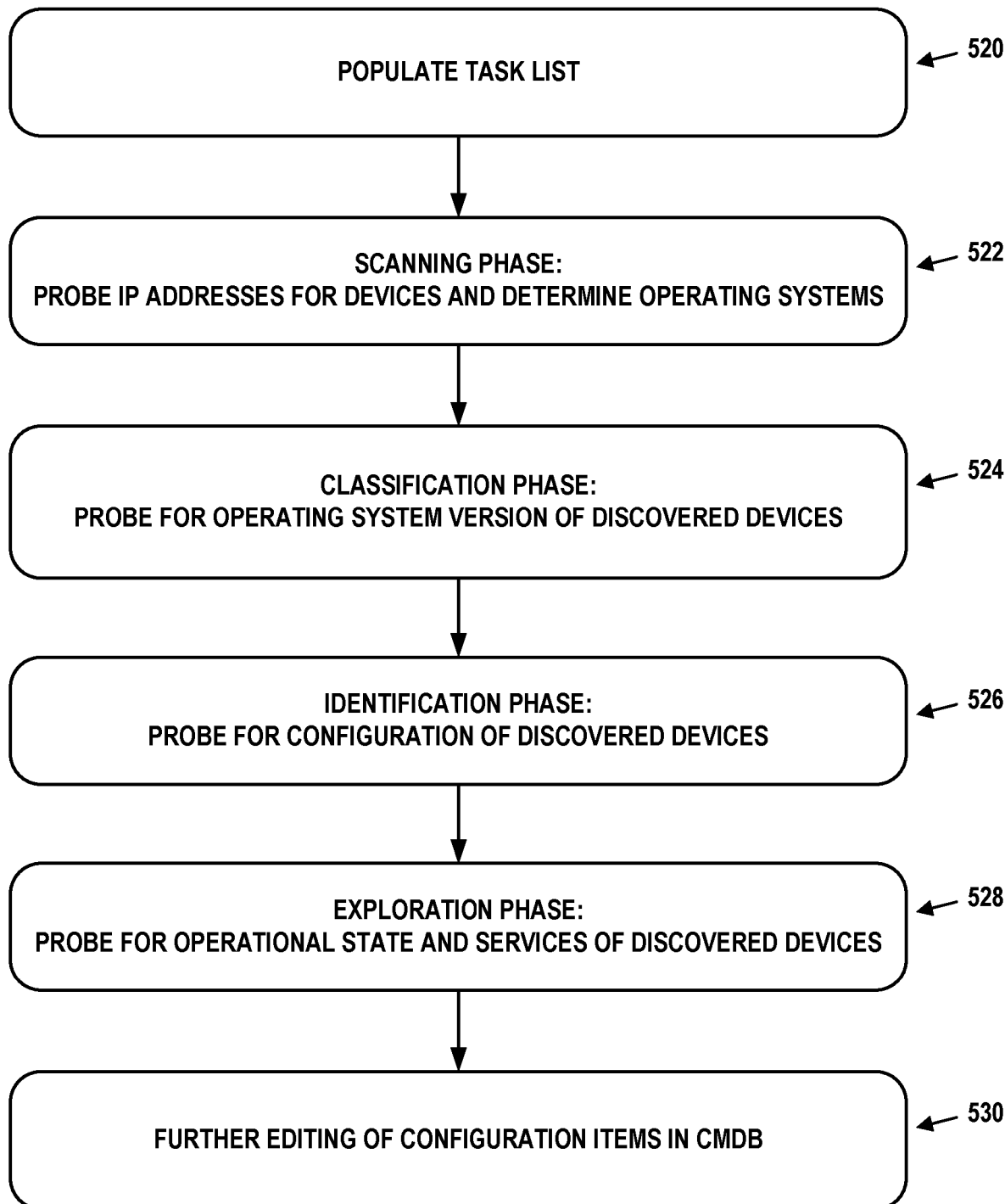
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example User Interfaces and User Interface Generation

A GUI may include a plurality of components, some of which may be organized according to one or more hierarchies. In some cases, it may be desirable to display the components in a visually-rich/ornate manner to provide a summary of the respective resource associated with each component, and/or provide visual "anchors" that a user can use to quickly and consistently locate a particular component (e.g., by looking for a visual pattern associated with the particular component). In other cases, it may be desirable to display the components in a manner that facilitates maneuverability through these components, such as by allowing the user to quickly switch between displaying resources associated with different components. Accordingly, provided herein is a GUI that allows for components to be displayed in a visually-rich/ornate manner, and/or in a manner that facilitates maneuverability. Further, the GUI provides a mechanism for quickly and easily switching between the visually-rich/ornate rendering of the components, and the highly-maneuverable rendering of the components. Thus, a user may quickly modify aspects of the GUI based on the user's GUI usage preferences, a task that the user is trying to accomplish via the GUI, and/or other contextual factors.

Figure 6A:
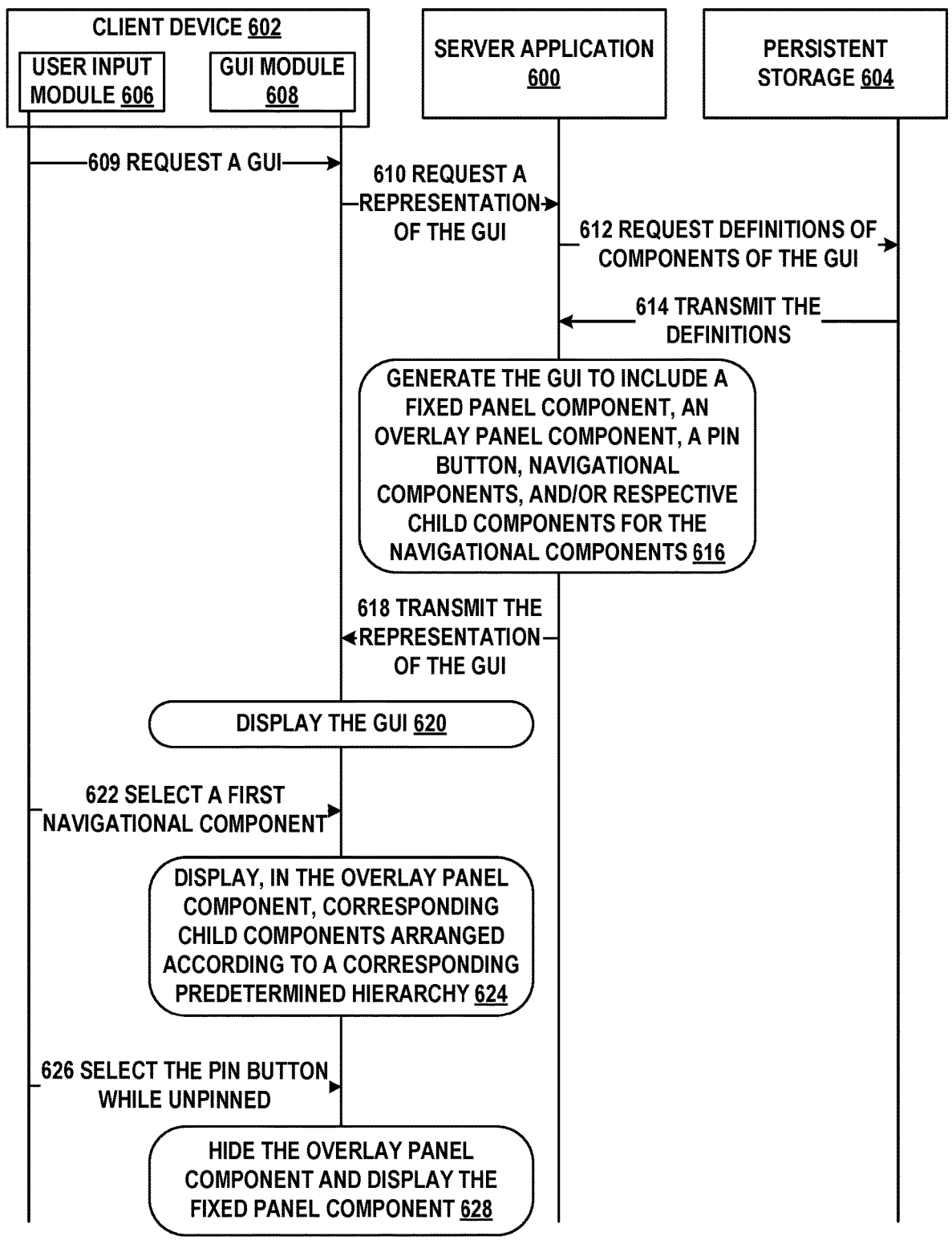
FIGS. 6A and 6B illustrate a message flow diagram, in accordance with example embodiments.
Figure 6B:
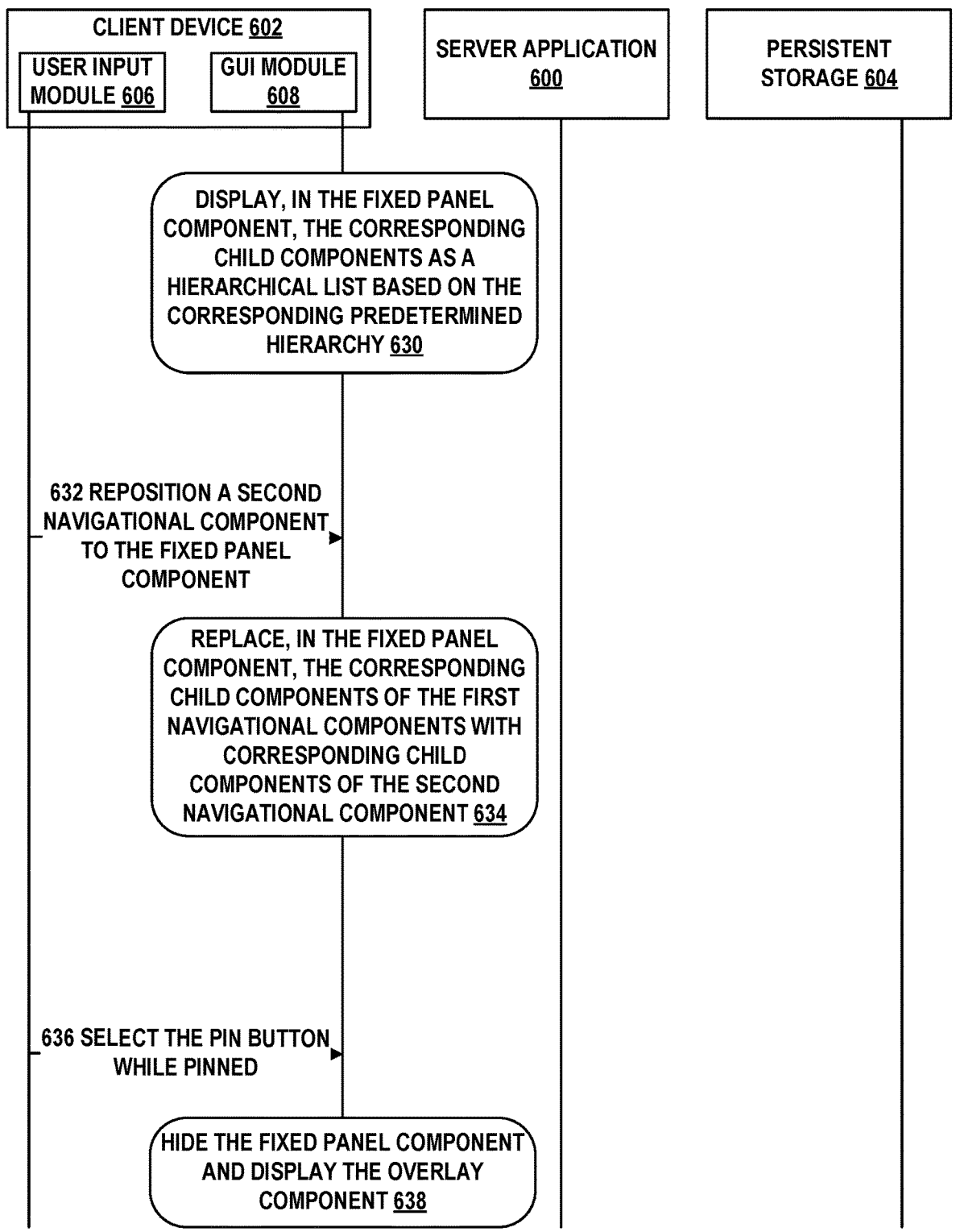

FIGS. 6A and 6B illustrates a message flow diagram of operations related to generating aspects of the GUI. Specifically, FIGS. 6A and 6B illustrate server application 600, client device 602, and persistent storage 604. Server application 600 may be configured to generate one or more GUIs by way of which client device 602 may be able to interact with various resources, such as software applications, webpages, files, data, and/or other information. Server application 600 may, for example, be executed by a server device. Aspects of the various resources exposed via the GUI may be stored in persistent storage 604 and/or executed/provided by server application 600. In some implementations, server application 600 and/or persistent storage 604 may be disposed within computational instance 322. Persistent storage 604 may represent, for example, CMDB 500 or some other database.

Client device 602 may be a user device, such as a desktop computer, tablet computer, smartphone, and/or other computing device, through which a user may interact with the GUI and/or the resources provided by server application 600. Client device 602 may, for example, be disposed within or otherwise associated with managed network 300. Client device 602 may include user input module 606, which may be configured to receive, from various hardware components of client device 602, signals representing user input. User input module 606 may be further configured to forward the signals to the relevant software applications (e.g., a web browser), thus allowing users to interact with the software applications by way of the hardware components. In some cases, user input module 606 may form part of an operating system of client device 602. Client device 602 may also include GUI module 608 configured to facilitate display of the GUI and modify the GUI based on user input. For example, GUI module 608 may represent aspects of a software application (e.g., the web browser) installed on client device 602.

Thus, user input module 606 may be configured to generate, based on user input, a signal representing a request for a GUI, as indicated by arrow 609. For example, user input module 606 may generate the signal based on user input provided to a software application (e.g., the web browser), such as the provisioning of a uniform resource locator (URL), a selection of a hyperlinked component within another GUI, and/or another interaction that specifies the GUI. Based on and/or in response to reception of the signal at arrow 609, GUI module 608 may be configured to transmit, to server application 600, a request for a representation of the GUI, as indicated by arrow 610.

Based on and/or in response to reception of the request at arrow 610, server application 600 may be configured to transmit, to persistent storage 604, a request for definitions of components of the GUI, as indicated by arrow 612. These components may include a fixed panel component, an overlay panel component, a content area component, a pin button, a plurality of navigational components, and respective pluralities of child components for the navigational components, among others. Based on and/or in response to reception of the request at arrow 612, persistent storage 604 may be configured to retrieve the definitions and transmit the definitions to server application 600, as indicated by arrow 614.

Based on and/or in response to reception of the definitions at arrow 614, server application 600 may be configured to generate the GUI, as indicated by block 616. Specifically, the GUI may be generated to include one or more of the fixed panel component, the overlay panel component, the pin button, the plurality of navigational components, and/or the respective child components for the navigational components. In some implementations, some aspects of the GUI may be predetermined (e.g., by a programmer, user, and/or administrator), and, unless manually modified, these aspects of the GUI may consistently form part of the GUI across different generations thereof over time. Other aspects of the GUI may be generated dynamically, such as by way of one or more machine learning models (e.g., an artificial neural network) executed by and/or in conjunction with server application 600, and may thus automatically change across different generations of the GUI over time.

Each of the components of the GUI may be positioned at respective locations within the GUI, thereby defining a layout of the GUI. In some examples, the locations may be absolute locations defined with respect to a viewport of the GUI. In other examples, the locations may be relative locations defined with respect to one or more other components. Further, in some examples, the GUI may include multiple vertical layers and the components may be distributed among these vertical layers to achieve a desired visual appearance and/or user experience. For example, components positioned in a first layer may, when shown, wholly or partially occlude and/or overlap one or more components in a second layer positioned below the first layer.

Based on and/or in response to generation of the GUI at block 616, server application 600 may be configured to transmit the representation of the GUI to GUI module 608, as indicated by arrow 618. In one example, the GUI may be represented by software code written using a markup language, such as hypertext markup language (HTML), a style language that defines the visual appearance of the predetermined components, such as cascading style sheets (CSS), and/or a scripting language that defines the behavior of the components, such as JAVASCRIPT®, among others. Based on and/or in response to reception of the transmission at arrow 618, GUI module 608 may be configured to display (e.g., by way of a display of client device 602) the GUI, as indicated by block 620.

Figure 7A:
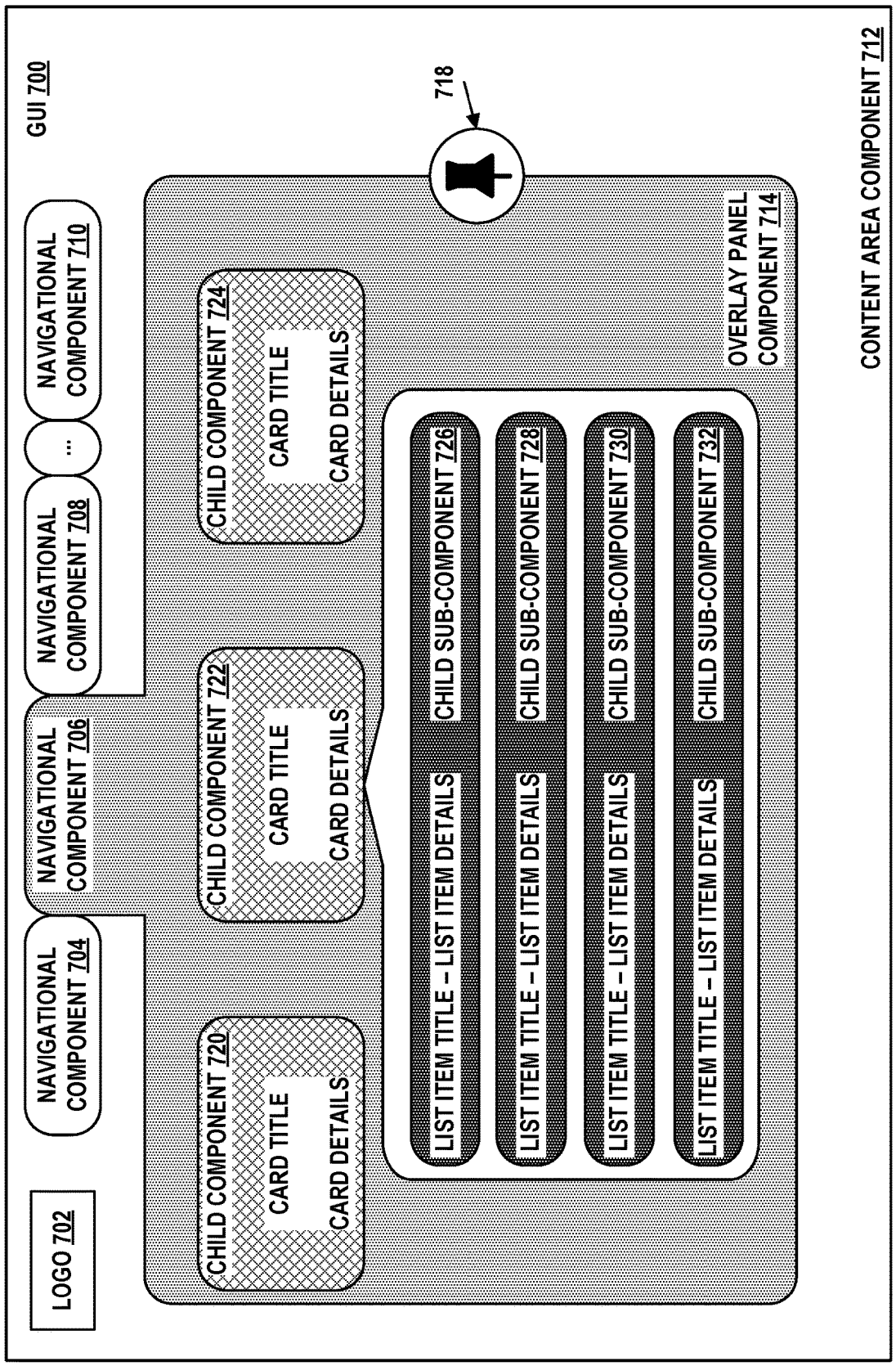

FIG. 7A illustrates an example GUI that may be generated at block 616 and/or displayed at block 620. Specifically, FIG. 7A illustrates GUI 700, which may include logo 702, navigational components 704, 706, and 708 through 710 (i.e., navigational components 704-710), content area component 712, pin button 718, and overlay panel component 714. A horizontal extent of the viewport of GUI 700 may be defined by the outermost rectangle shown in FIG. 7A. The size of the viewport may vary, for example, based on resizing of a window within which GUI 700 is displayed. In some cases, navigational components 704-710 may form a subset of content area component 712. In other cases, navigational components 704-710 may for part of a distinct navigational panel component disposed above content area component 712.

Each of navigational components 704-710 may be associated with a corresponding plurality of child components organized according to a corresponding predetermined hierarchy. In some cases, the corresponding predetermined hierarchy of some navigational components may be predefined by a programmer, user, administrator, and/or other operator associated with GUI 700. In other cases, the corresponding predetermined hierarchy of other navigational components may be dynamically predetermined by server application 600 (e.g., using one or more machine learning models) each time a representation of GUI 700 is generated.

When a particular navigational component of navigational components 704-710 is selected, overlay panel component 714 may be used to display the corresponding plurality of child components organized according to the corresponding predetermined hierarchy. Before the particular navigational component is selected, and/or after the particular navigational component is re-selected, overlay panel component 714 may be hidden.

Thus, turning back to FIG. 6A, user input module 606 may be configured to generate, based on user input, a signal representing a selection of a first (particular) navigational component, as indicated by arrow 622. Based on and/or in response to reception of the signal at arrow 622, GUI module 608 may be configured to display, in the overlay panel component, the corresponding plurality of child components associated with the first navigational component, as indicated by block 624. Specifically, the corresponding plurality of child components may be visually arranged according to the corresponding predetermined hierarchy. The overlay panel component and the plurality of child components may be hidden by re-selecting the first navigational component, and/or by selecting a "close" button that is part of the overlay panel component, among other possibilities.

As an example, FIG. 7A illustrates navigational component 706 after it has been selected by way of interaction with (e.g., touching, tapping, clicking, etc.) a corresponding portion of GUI 700 using client device 602. Navigational component 706 is associated with child components 720, 722, and 724 (i.e., child components 720-724), and child component 722 is further associated with child sub-components 726, 728, 730, and 732 (i.e., child sub-components 726-732). Similarly, child components 720 and 724 may each be associated with further child sub-components. Child components 720-724 and the child sub-components thereof (e.g., shown child sub-components 726-732, and any further child sub-components that are not shown) may collectively be referred to as child components 720-732.

Each of child components 720-732 may be associated with a corresponding visual format. For example, child components 720-724 are each represented by a corresponding card that includes a corresponding card title and card details configured to convey information associated with a corresponding resource. Child sub-components 726-732 are each represented by a corresponding list item that includes a corresponding list item title and list item details configured to convey information associated with a corresponding resource. In other examples, the visual format may additionally or alternatively include a graph, a table, a text field, a modal window, and/or another overlay panel, among other possibilities. Thus, the visual format may define the aspects of the underlying resource that are displayed by a particular component in order to summarize a state associated with the underlying resource.

The visual format of each respective child component of child components 720-732 may further define a size, a color, a font size, and/or other visual parameters of the respective child component. Thus, the visual format may also define a visual pattern associated with the particular component that facilitates visual localization of the particular component by a user. Overlay panel component 714 may be configured to display child components in accordance with their respective visual formats, and may thus provide a visually-rich and/or ornate rendering of these components.

Figure 7B:
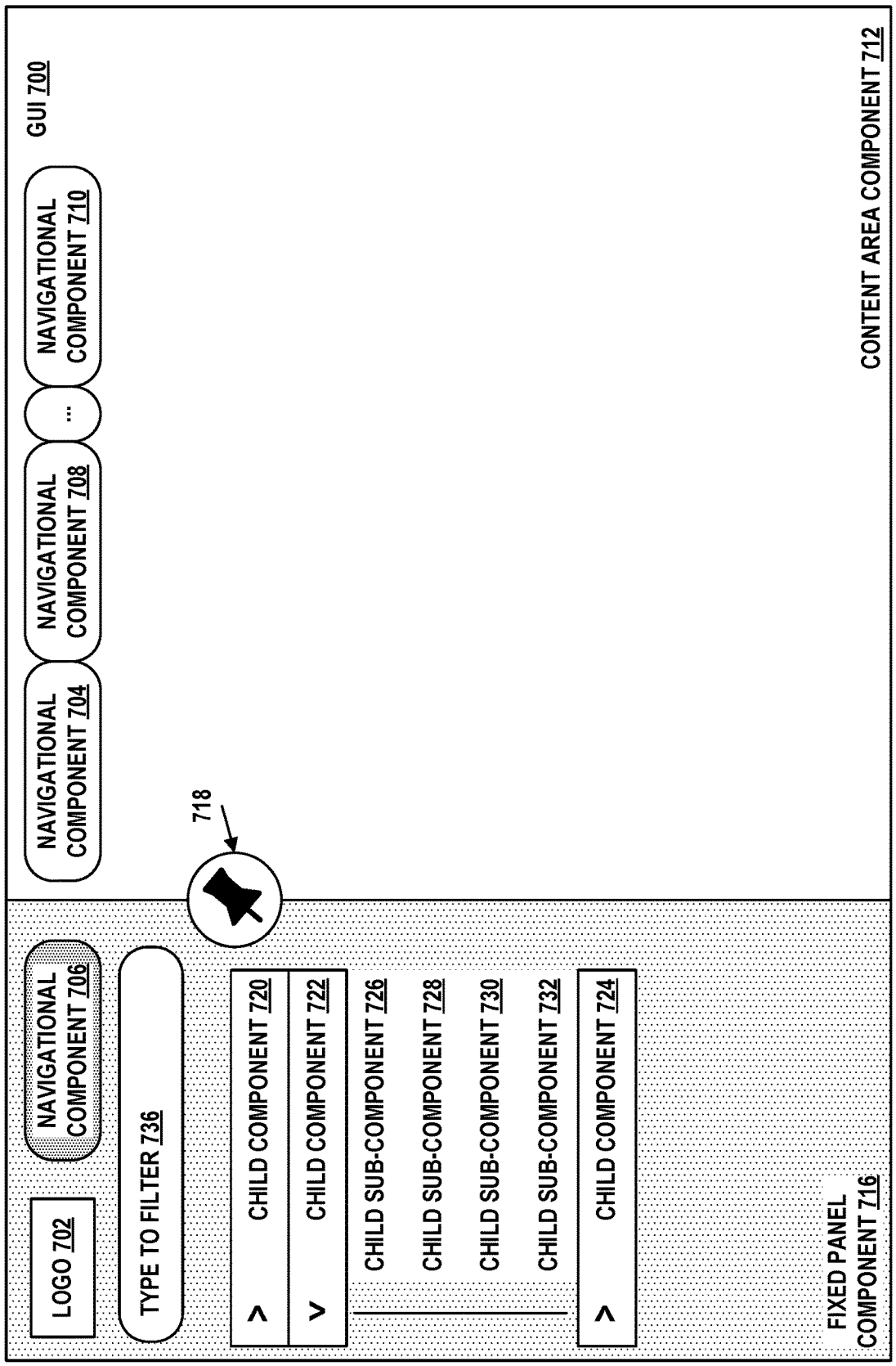

In some implementations, such as that shown in FIG. 7A, GUI 700 may be organized into two layers. A first (top) layer may contain logo 702, navigational components 704-710, and overlay panel component 714. Further, the first layer may also contain child components 720-732 and pin button 718 due to these components being part of overlay panel component 714. A second (bottom) layer may contain content area component 712 and, as shown in FIG. 7B, fixed panel component 716. In some cases, navigational components 704-710 may instead be contained in the second layer. When displayed (rather than hidden), components positioned in the first layer may partially or wholly occlude components positioned in the second layer. For example, as shown in FIG. 7A, overlay panel component 714 occludes part of content area component 712 (and thus part of any content displayed thereby).

The manner in which child components 720-732 are displayed may be modified by interacting with pin button 718. Specifically, turning back to FIG. 6A, user input module 606 may be configured to generate, based on user input, a signal representing a selection of the pin button while the pin button is in an "unpinned" configuration (e.g., displayed as part of the overlay panel component), as indicated by arrow 626. Based on and/or in response to reception of the signal at arrow 626, GUI module 608 may be configured to hide the overlay panel component and display the fixed panel component, as indicated by block 628. Further, GUI module 608 may also be configured to display, in the fixed panel component, the corresponding child components as a hierarchical list based on the corresponding predetermined hierarchy, as indicated by block 630 of FIG. 6B. That is, the fixed panel component may be configured to display the child components initially displayed by way of the overlay panel component, and may do so in a manner that facilitates navigation and quick switching between different resources represented by the child components.

FIG. 7B illustrates an example arrangement of components of GUI 700 after selection of pin button 718. Specifically, in FIG. 7B, overlay panel component 714 is hidden and fixed panel component 716 is displayed. Each of child components 720-732 is displayed as a hierarchical list arranged according to the corresponding predetermined hierarchy of child components 720-732. Thus, fixed panel component 716 may be configured to preserve the corresponding predetermined hierarchy when displaying child components 720-720. In some cases, however, fixed panel component 716 may display child components 720-732 independently of the corresponding visual format of each child component. Accordingly, fixed panel component 716 may provide a visually-standardized arrangement of child components 720-732, while overlay panel component 714 may be configured to provide a visually-rich arrangement of child components 720-732.

Fixed panel component 716 may also include input field 736 associated with a search/filter function. Specifically, text provided to input field 736 may be used to filter the child components displayed within fixed panel component 716.

Further, the size of content area component 712 may be adjusted to accommodate display of fixed panel component 716 along the left side of the viewport of GUI 700. For example, both fixed panel component 716 and content area component 712 may be contained in the second (e.g., bottom) layer of GUI 700. Thus, when fixed panel component 716 is hidden (i.e., when pin button is in an "unpinned" state), content area component 712 may span the entire width of the second layer of the viewport. When fixed panel component 716 is displayed (i.e., when pin button is in a "pinned" state), however, the width of content area component 712 may be reduced to accommodate the width of fixed panel component 716 in the second layer of the viewport. Fixed panel component 716 is referred to herein as "fixed" in that it may be configured to occupy a particular section of the viewport, such as the left side thereof, as shown in FIG. 7B. In other implementations, however, fixed panel component 716 may instead be positioned in other regions of the viewport, such as on the right ride thereof or on the bottom thereof.

When a particular child component is selected from fixed panel component 716, aspects of the underlying resource may be displayed by way of content area component 712 while fixed panel component remains "pinned" to the left side of the viewport. Thus, different child components may be selected in rapid succession without hiding fixed panel component 716, thereby allowing a user to quickly view the respective resources associated with different child components. On the other hand, overlay panel component 714 may be hidden each time a particular child component is selected therefrom, thus allowing the underlying resource to be unobstructed when shown within content area component 712. In order to select a different child component by way of overlay panel component 714, the user may again select the corresponding navigational component, locate the different child component, and select the different child component. Thus, relative to overlay panel component 714, fixed panel component may allow for more rapid switching between the child components.

Thus, overlay panel component 714 may, due to the fact that it may be configured to provide more details as part of each child component, be used to provide an overview of the respective states associated with resources represented by the child components. On the other hand, fixed panel component 716 may, due to the fact that it facilitates rapid navigation through the child components, be used when a user expects to quickly switch between different child components. Notably, however, since users may be freely able to switch between fixed panel component 716 and overlay panel component 714 using pin button 718, different users may use these components in different ways based on, for example, individual preferences.

Additionally, when fixed panel component 716 is displayed, the locations of navigational components 704-710 may also be adjusted. First, the selected navigational component may be displayed within fixed panel component 716, and may be hidden or otherwise removed from content area component 712 (or the distinct navigational panel component). For example, in FIG. 7B, navigational component 706, which has been selected prior to selection of pin button 718, is displayed within fixed panel component 716, and is not shown between navigational components 704 and 706. Thus, the positions of remaining navigational components 704 and 708 through 710 may be adjusted to occupy the space previously occupied by navigational component 706. For example, navigational components 708 through 710 may be shifted leftward towards navigational component 704. Second, since content area component 712 is resized, navigational components 704 and 708 through 710 may also be shifted rightward to remain within content area component 712 (rather than continuing to occupy part of the area occupied by fixed panel component 716 when displayed).

Accordingly, the locations of fixed panel component 716 and content area component 712 (and/or the distinct navigational panel component) may be defined relative to the viewport, while the locations of navigational components 704-710 may be defined relative to content area component 712 (or the distinct navigational panel component). Thus, as the viewport is resized (e.g., based on a web browser window being resized) and/or additional components are added to the bottom layer of GUI 700, the respective sizes of fixed panel component 716 and content area component 712 (and/or the distinct navigational panel component) may change. Further, as content area component 712 (and/or the distinct navigational panel component) is resized, the locations and/or size of navigational components 704-710 relative to the viewport may change, while remaining the same relative to content area component 712 (and/or the distinct navigational panel component).

The changes described above to the sizing and locations of components of GUI 700 may be achieved in various ways. For example, the representation of GUI 700 may include one or more JAVASCRIPT® scripts configured to cause GUI 700 to behave in the manner described. Specifically, selection of pin button 718 may generate an event (e.g., the "onclick" event), which may be configured to trigger the execution of one or more scripts that (i) set a display property of overlay panel component 714 to a value indicating that this component is to be hidden, (ii) set a display property of fixed panel component 716 to a value indicating that this component is to be displayed, (iii) set a display property of pin button 718 to a value indicating that this component is to be displayed in an "unpinned" configuration, and/or (iv) recalculate a size of content area component 712 based on a size of fixed panel component 716, among other operations.

Further, a document object model (DOM) of GUI 700 may include, as a subset of overlay panel component 714, a first representation (e.g., HTML and/or CSS code) of child components 720-732 that defines the corresponding hierarchy and visual appearances thereof. The DOM may also include, as a subset of fixed panel component 716, a second representation of child components 720-732 that defines the corresponding hierarchy but omits the visual appearances thereof. The one or more scripts may be configured to display portions of these representations by modifying attributes of elements of the DOM based on whether overlay panel component 714 or fixed panel component 716 is displayed, and/or based on which one of child components 720-732 is selected.

Returning to FIG. 6B, user input module 606 may be configured to generate, based on user input, a signal representing a repositioning of a second navigational component to the fixed panel component, as indicated by arrow 632. The signal may indicate, for example, that the second navigational component has been (i) selected, (ii) moved while remaining selected, and (iii) released or unselected while disposed above/within the fixed panel component. Based on and/or in response to reception of the signal at arrow 632, GUI module 608 may be configured to replace, in the fixed panel component, the corresponding child components of the first navigational component with corresponding child components of the second navigational component, as indicated by block 634.

Figure 7D:
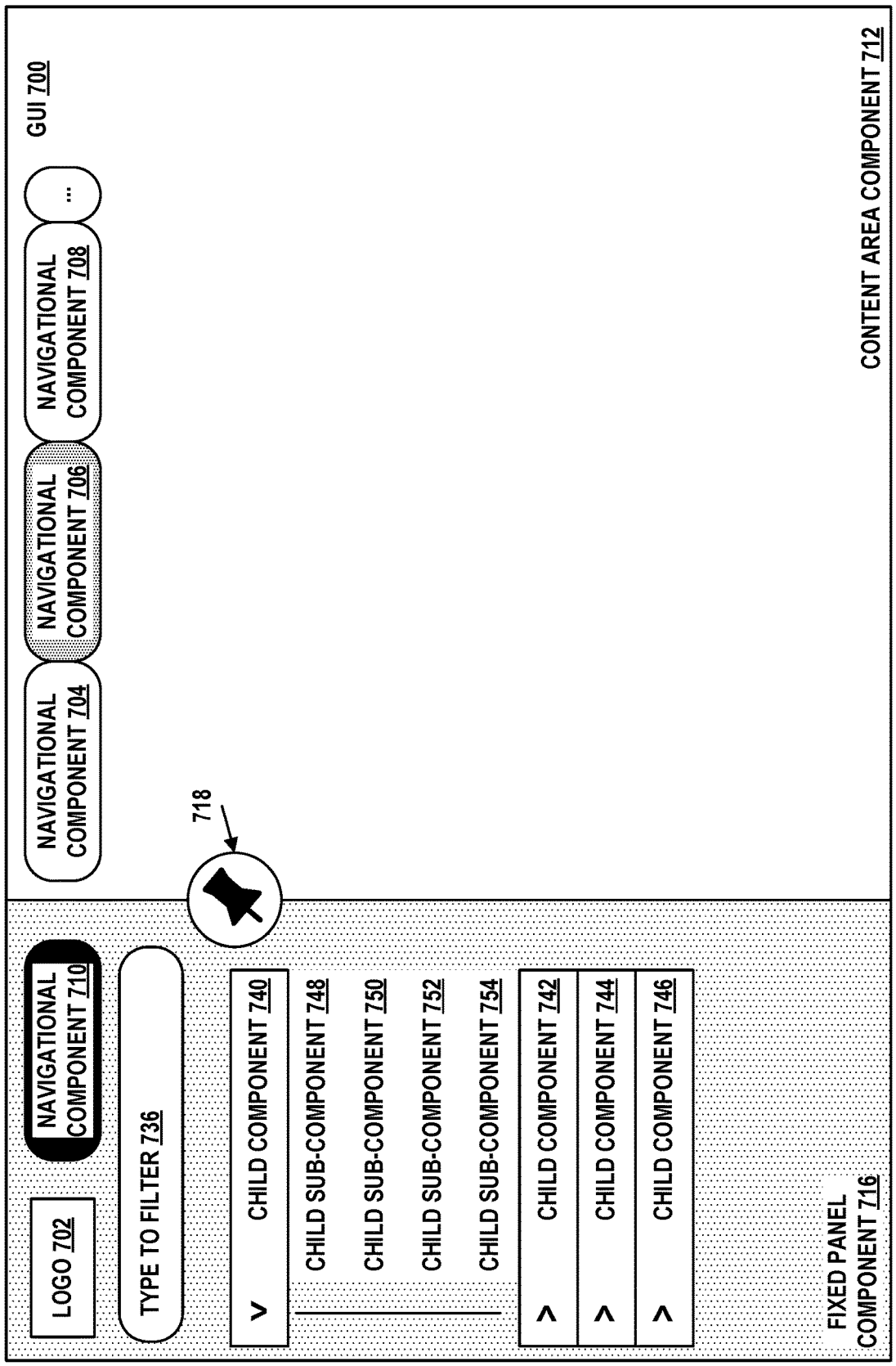

FIG. 7C illustrates an example repositioning of the second component, while FIG. 7D illustrates the state of GUI 700 after the repositioning. For example, as shown in FIG. 7C, while navigational component 706 and the child components thereof are displayed by way of fixed panel component 716, navigational component 710 may be repositioned from its location within content area component 712 (or the distinct navigational panel component) to fixed panel component 716, as indicated by arrow 734. For example, a touch screen and/or mouse may be used to drag navigational component 710 from its initial position to the area of GUI 700 occupied by fixed panel component 716. Specifically, one or more JAVASCRIPT® scripts may be configured to detect that navigational component 710 has been selected and, while navigational component 710 remain selected (e.g., while the touch screen remains depressed and/or the mouse button remains depressed), navigational component 710 may be repositionable. Thus, navigational component 710 may be moved across GUI 700 and guided to fixed panel component 716.

In some cases, while navigational component 710 is being moved, the visual appearance of fixed panel component 716 may be modified to indicate that fixed panel component 716 is a valid drop-off spot for navigational component 710. For example, the outline of fixed panel component 716 may be changed from solid lines to dashed lines of increased thickness, as shown in FIG. 7C. In another example, the color of fixed panel component 716 may additionally or alternatively be changed.

Based on and/or in response to navigational component 710 being released as it is positioned over fixed panel component 716, the one or more scripts may be configured to replace the representation of navigational component 706 and its child components within fixed panel component 716 with a representation of navigational component 710 and its child components. Thus, FIG. 7D shows fixed panel component 716 containing therein navigational component 710, child components 740, 742, 744, and 746, as well as child sub-components 748, 750, 752, and 754 depending from child component 740. Further, navigational component 706 has been returned to its corresponding location within content area component 712 (or the distinct navigational panel component). Thus, navigational component 706 is shown between navigational components 704 and 708.

Each of components 704, 706, and/or 708 may be repositioned to within fixed panel component 716, resulting in the corresponding child components thereof being shown as a hierarchical list within fixed panel component 716. That is, returning to FIG. 6B, the operations of arrow 632 and block 634 may be repeated with respect to other navigational components. Thus, fixed panel component 716 may further facilitate navigation through GUI 700 by displaying the child components of one navigational component at a time, rather than simultaneously displaying all child components associated with the plurality of navigational components.

User input module 606 may also be configured to generate a signal representing a selection of the pin button while the pin button is in a "pinned" configuration (e.g., displayed as part of the fixed panel component), as indicated by arrow 636. Based on and/or in response to reception of the signal at arrow 636, GUI module 608 may be configured to hide the fixed panel component and display the overlay panel component, as indicated by block 638. GUI module 608 may be configured to display, as part of the overlay panel component, the corresponding plurality of child components previously displayed by the now-hidden fixed panel component.

Figure 7E:
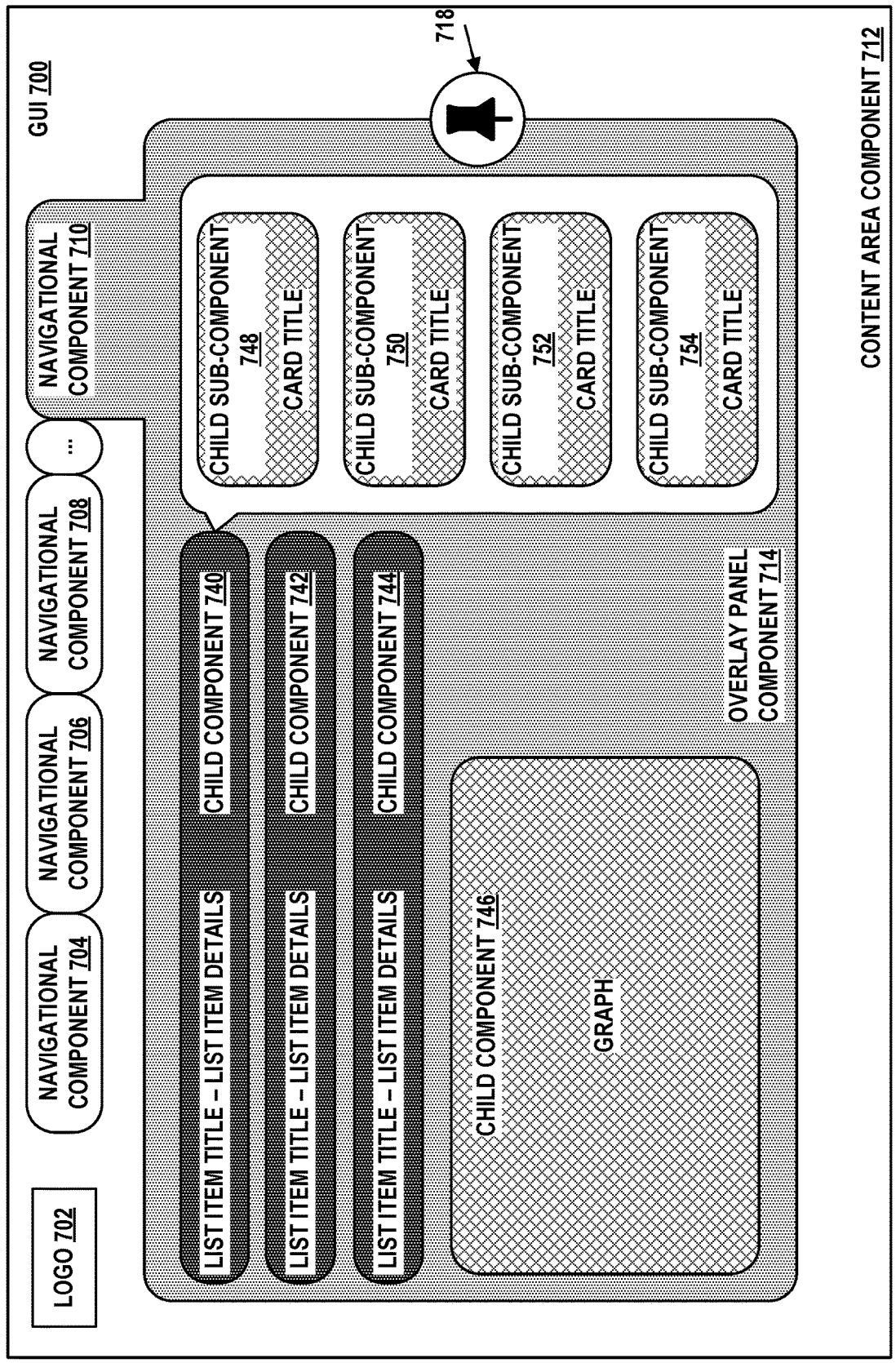

FIG. 7E illustrates the state of GUI 700 after pin button 718 has been selected while GUI 700 was in the state illustrated in FIG. 7D (i.e., while pin button 718 was "pinned"). Specifically, due to selection of pin button 718, fixed panel component 716 has been hidden, and is thus not shown in FIG. 7E, while overlay panel component 714 has again been displayed. Further, overlay panel component 714 is populated with the child components of navigational component 710, rather than navigational component 706, since the child components of navigational component 710 were displayed by fixed panel component 716 when pin button 718 was selected.

Thus, in FIG. 7E, overlay panel component 714 displays child components 740, 742, and 744 as list items, child component 746 as a graph, and child sub-components 748, 750, 752, and 754 as cards. In addition to the hierarchy of the child components of navigational component 710 shown by fixed panel component 716 in FIG. 7D, overlay panel component 714 in FIG. 7E also conveys the visual appearance of each of these child components. Accordingly, fixed panel component 716 may facilitate quick navigation through the child components by illustrating the hierarchy thereof with a hierarchical list, while overlay panel component 714 may provide additional information with respect to each child component. For example, child component 746 may provide more information when shown as a graph (e.g., a "sparkline" graph) as part of overlay display component 714, rather than as an element of the hierarchical list in fixed panel component 716.

VI. Example Operations

Figure 8:
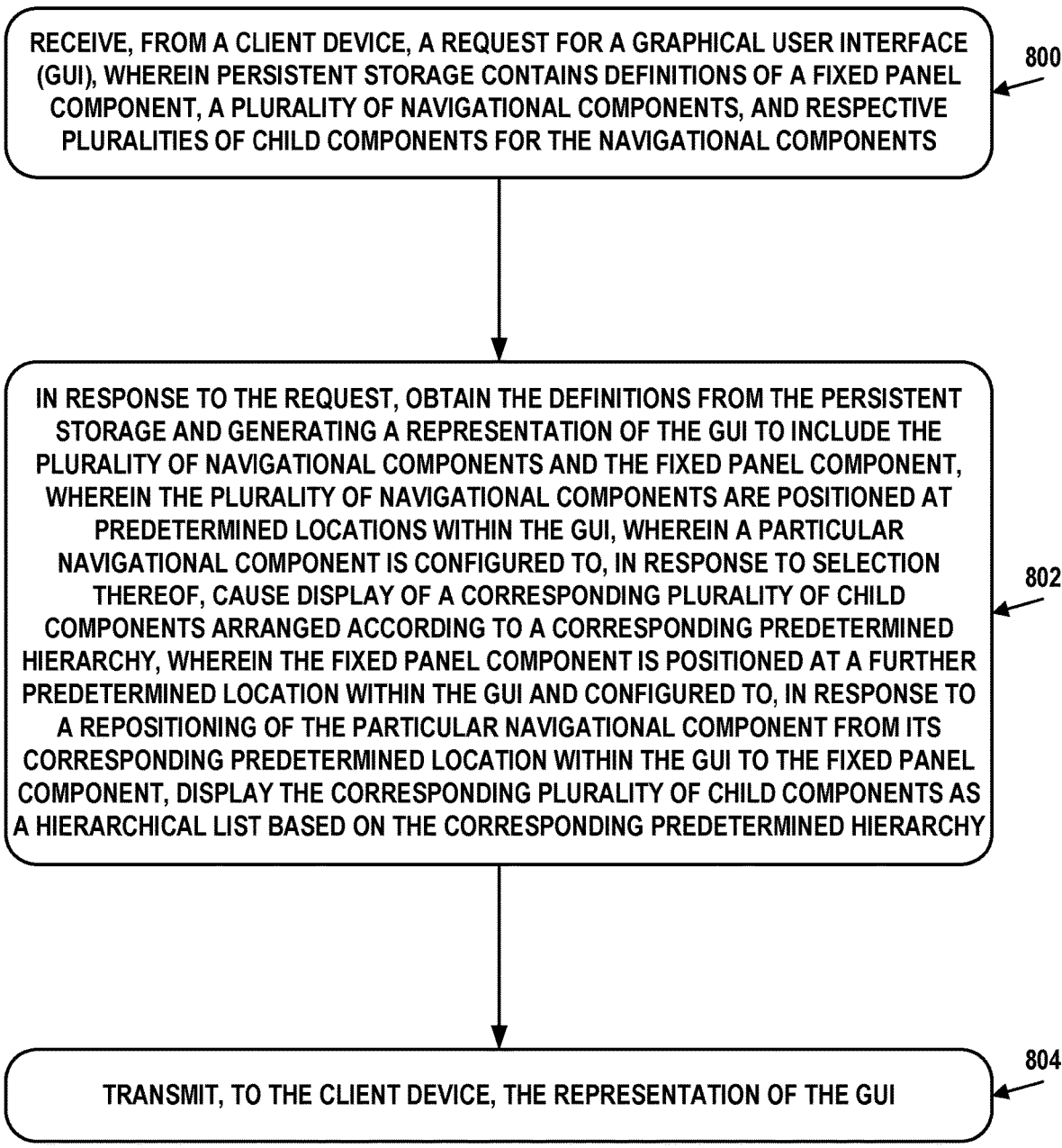
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a computational instance of a remote network management platform, server application 600, or a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may include receiving, from a client device, a request for a GUI. Persistent storage may contain definitions of a fixed panel component, a plurality of navigational components, and respective pluralities of child components for the navigational components.

Block 802 may include, in response to the request, obtaining the definitions from the persistent storage and generating a representation of the GUI to include the plurality of navigational components and the fixed panel component. The plurality of navigational components may be positioned at predetermined locations within the GUI. A particular navigational component may be configured to, in response to selection thereof, cause display of a corresponding plurality of child components arranged according to a corresponding predetermined hierarchy. The fixed panel component may be positioned at a further predetermined location within the GUI and may be configured to, in response to a repositioning of the particular navigational component from its corresponding predetermined location within the GUI to the fixed panel component, display the corresponding plurality of child components as a hierarchical list based on the corresponding predetermined hierarchy.

Block 804 may include transmitting, to the client device, the representation of the GUI.

In some embodiments, the representation of the GUI may be generated to further include a first layer of the GUI disposed above a second layer of the GUI, an overlay panel component, and a pin button. The fixed panel component may be configured to be displayed in the second layer of the GUI. The overlay panel component may be configured to be displayed in the first layer of the GUI. The particular navigational component may be configured to, in response to selection thereof, cause the overlay panel component to display the corresponding plurality of child components arranged according to the corresponding predetermined hierarchy. The pin button may be configured to, based on selection of the pin button by way of the client device, toggle the GUI between (i) displaying the corresponding plurality of child components in the overlay panel component and (ii) displaying the corresponding plurality of child components in the fixed panel component.

In some embodiments, the toggling of the GUI may include hiding the fixed panel component while displaying the corresponding plurality of child components in the overlay panel component, and hiding the overlay panel component while displaying the corresponding plurality of child components in the fixed panel component.

In some embodiments, the pin button may be configured to be displayed in a pinned conformation as part of the fixed panel component and in an unpinned conformation as part of the overlay panel component.

In some embodiments, the overlay panel component may, when displayed, obstructs at least one other component in the second layer of the GUI.

In some embodiments, each respective child component of the corresponding plurality of child components may be associated with a corresponding visual format. The overlay panel component may be configured to display each respective child component according to the corresponding visual format.

In some embodiments, each respective child component of the corresponding plurality of child components may be associated with a corresponding visual format. The fixed panel component may be configured to display each respective child component independently of the corresponding visual format.

In some embodiments, the further predetermined location within the GUI may be defined relative to a viewport of the GUI. The predetermined locations within the GUI may be defined relative to a content area component of the GUI. The content area component may occupy a first portion of the viewport when the fixed panel component is displayed and a second portion of the viewport when the fixed panel component is hidden. The second portion of the viewport may be larger than the first portion of the viewport.

In some embodiments, the repositioning of the particular navigational component from its corresponding predetermined location within the GUI to the fixed panel component may include the particular navigational component being dragged from its corresponding predetermined location within the GUI to the further predetermined location within the GUI occupied by the fixed panel component.

In some embodiments, the fixed panel component may be further configured to, in response to the repositioning of the particular navigational component, display the particular navigational component within the fixed panel component. Remaining navigational components of the plurality of navigational components may be configured to adjust the predetermined locations thereof based on the repositioning of the respective component.

In some embodiments, the fixed panel component may be configured such that when the fixed panel component displays the corresponding plurality of child components of a first navigational component of the plurality of navigational components, a repositioning of a second navigational component of the plurality of navigational components from its corresponding predetermined location within the GUI to the fixed panel component causes a replacement of (i) the corresponding plurality of child components of the first navigational component with (ii) the corresponding plurality of child components of the second navigational component.

In some embodiments, the fixed panel component may be configured such that when the fixed panel component displays the corresponding plurality of child components of a first navigational component of the plurality of navigational components, the fixed panel component displays the first navigational component within the fixed panel component. A repositioning of a second navigational component of the plurality of navigational components from its corresponding predetermined location within the GUI to the fixed panel component may be configured to cause (i) the first navigational component to be replaced within the fixed panel component by the second navigational component and (ii) the first navigational component to be returned to its corresponding predetermined location within the GUI.

In some embodiments, the GUI may further include an input field disposed within the fixed panel component and configured to (i) receive textual input and (ii) filter the corresponding plurality of child components based on the textual input.

Figure 9:
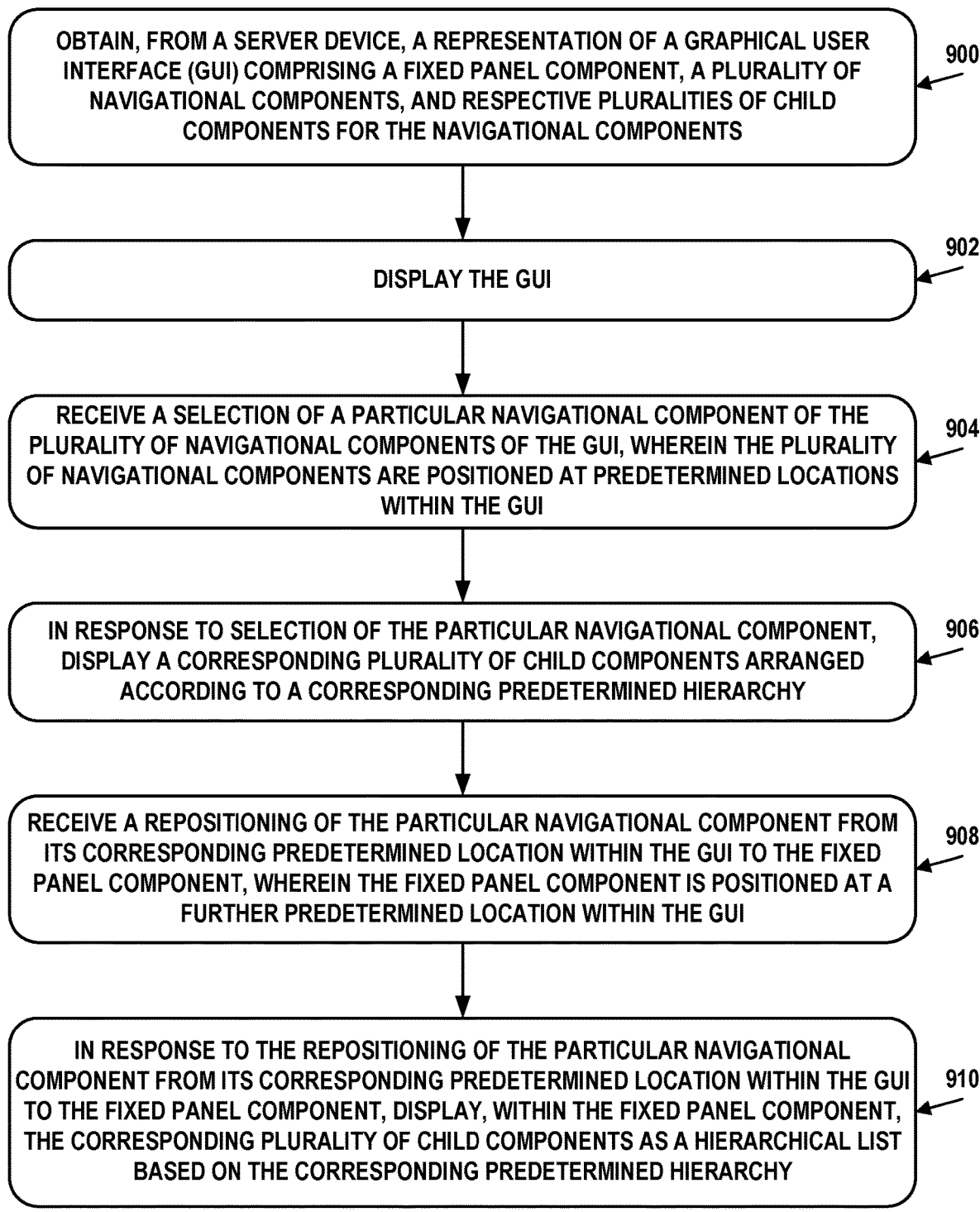
FIG. 9 is a flow chart, in accordance with example embodiments.

FIG. 9 is a flow chart illustrating an example embodiment. The process illustrated by FIG. 9 may be carried out by a computing device, such as computing device 100. However, the process can be carried out by other types of devices or device subsystems. For example, the process could be carried out by client devices 302 within managed network 300, client device 602, or a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may include obtaining, from a server device, a representation of a GUI that includes a fixed panel component, a plurality of navigational components, and respective pluralities of child components for the navigational components.

Block 902 may include displaying the GUI.

Block 904 may include receiving a selection of a particular navigational component of the plurality of navigational components of the GUI. The plurality of navigational components may be positioned at predetermined locations within the GUI.

Block 906 may include, in response to selection of the particular navigational component, displaying a corresponding plurality of child components arranged according to a corresponding predetermined hierarchy.

Block 908 may include receiving a repositioning of the particular navigational component from its corresponding predetermined location within the GUI to the fixed panel component. The fixed panel component may be positioned at a further predetermined location within the GUI.

Block 910 may include, in response to the repositioning of the particular navigational component from its corresponding predetermined location within the GUI to the fixed panel component, displaying, within the fixed panel component, the corresponding plurality of child components as a hierarchical list based on the corresponding predetermined hierarchy.

In some embodiments, the representation of the GUI may further include a first layer of the GUI disposed above a second layer of the GUI, an overlay panel component, and a pin button. The fixed panel component may be displayed in the second layer of the GUI. The overlay panel component may be displayed in the first layer of the GUI. In response to selection of the particular navigational component, the overlay panel component may display the corresponding plurality of child components arranged according to the corresponding predetermined hierarchy. Selection of the pin button may toggle the GUI between (i) displaying the corresponding plurality of child components in the overlay panel component and (ii) displaying the corresponding plurality of child components in the fixed panel component.

In some embodiments, the toggling of the GUI may include hiding the fixed panel component while displaying the corresponding plurality of child components in the overlay panel component, and hiding the overlay panel component while displaying the corresponding plurality of child components in the fixed panel component.

In some embodiments, the pin button may be displayed in a pinned conformation as part of the fixed panel component and in an unpinned conformation as part of the overlay panel component.

In some embodiments, the overlay panel component may, when displayed, obstructs at least one other component in the second layer of the GUI.

In some embodiments, each respective child component of the corresponding plurality of child components may be associated with a corresponding visual format. The overlay panel component may display each respective child component according to the corresponding visual format.

In some embodiments, each respective child component of the corresponding plurality of child components may be associated with a corresponding visual format. The fixed panel component may display each respective child component independently of the corresponding visual format.

In some embodiments, the further predetermined location within the GUI may be defined relative to a viewport of the GUI. The predetermined locations within the GUI may be defined relative to a content area component of the GUI. The content area component may occupy a first portion of the viewport when the fixed panel component is displayed and a second portion of the viewport when the fixed panel component is hidden. The second portion of the viewport may be larger than the first portion of the viewport.

In some embodiments, the repositioning of the particular navigational component from its corresponding predetermined location within the GUI to the fixed panel component may include the particular navigational component being dragged from its corresponding predetermined location within the GUI to the further predetermined location within the GUI occupied by the fixed panel component.

In some embodiments, the fixed panel component may, in response to the repositioning of the particular navigational component, display the particular navigational component within the fixed panel component. The predetermined locations of remaining navigational components of the plurality of navigational components may be adjusted based on the repositioning of the respective component.

In some embodiments, when the fixed panel component displays the corresponding plurality of child components of a first navigational component of the plurality of navigational components, a repositioning of a second navigational component of the plurality of navigational components from its corresponding predetermined location within the GUI to the fixed panel component may cause a replacement of (i) the corresponding plurality of child components of the first navigational component with (ii) the corresponding plurality of child components of the second navigational component.

In some embodiments, when the fixed panel component displays the corresponding plurality of child components of a first navigational component of the plurality of navigational components, the fixed panel component may display the first navigational component within the fixed panel component. A repositioning of a second navigational component of the plurality of navigational components from its corresponding predetermined location within the GUI to the fixed panel component may cause (i) the first navigational component to be replaced within the fixed panel component by the second navigational component and (ii) the first navigational component to be returned to its corresponding predetermined location within the GUI.

In some embodiments, the GUI may further include an input field disposed within the fixed panel component and configured to (i) receive textual input and (ii) filter the corresponding plurality of child components based on the textual input.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    persistent storage containing definitions of a fixed panel component, an overlay panel component, a plurality of navigational components, and respective pluralities of child components for the navigational components; and
    one or more processors configured to perform operations comprising:
        receiving, from a client device, a request for a graphical user interface (GUI);
        in response to the request, obtaining the definitions from the persistent storage and generating a representation of the GUI to include the plurality of navigational components, the overlay panel component, a pin button, and the fixed panel component, wherein the plurality of navigational components are positioned at predetermined locations within the GUI, wherein a particular navigational component is configured to, in response to selection thereof, cause the overlay panel component to display a corresponding plurality of child components arranged according to a corresponding predetermined hierarchy, wherein the fixed panel component is positioned at a further predetermined location within the GUI and configured to, in response to a repositioning of the particular navigational component from its corresponding predetermined location within the GUI to the fixed panel component, display the corresponding plurality of child components as a hierarchical list based on the corresponding predetermined hierarchy, and wherein the pin button is configured to, based on selection of the pin button by way of the client device, toggle the GUI between (i) displaying the corresponding plurality of child components in the overlay panel component and (ii) displaying the corresponding plurality of child components in the fixed panel component; and transmitting, to the client device, the representation of the GUI.

2. The system of claim 1, wherein the representation of the GUI is generated to further include:
a first layer of the GUI disposed above a second layer of the GUI, wherein the fixed panel component is configured to be displayed in the second layer of the GUI, and wherein the overlay panel component is configured to be displayed in the first layer of the GUI.

3. The system of claim 1, wherein the toggling of the GUI comprises:
hiding the fixed panel component while displaying the corresponding plurality of child components in the overlay panel component; and
hiding the overlay panel component while displaying the corresponding plurality of child components in the fixed panel component.

4. The system of claim 1, wherein the pin button is configured to be displayed in a pinned conformation as part of the fixed panel component and in an unpinned conformation as part of the overlay panel component.

5. The system of claim 2, wherein, when displayed, the overlay panel component obstructs at least one other component in the second layer of the GUI.

6. The system of claim 1, wherein each respective child component of the corresponding plurality of child components is associated with a corresponding visual format, and wherein the overlay panel component is configured to display each respective child component according to the corresponding visual format.

7. The system of claim 1, wherein each respective child component of the corresponding plurality of child components is associated with a corresponding visual format, and wherein the fixed panel component is configured to display each respective child component independently of the corresponding visual format.

8. The system of claim 1, wherein the further predetermined location within the GUI is defined relative to a viewport of the GUI, wherein the predetermined locations within the GUI are defined relative to a content area component of the GUI, wherein the content area component occupies a first portion of the viewport when the fixed panel component is displayed and a second portion of the viewport when the fixed panel component is hidden, and wherein the second portion of the viewport is larger than the first portion of the viewport.

9. The system of claim 1, wherein the repositioning of the particular navigational component from its corresponding predetermined location within the GUI to the fixed panel component comprises the particular navigational component being dragged from its corresponding predetermined location within the GUI to the further predetermined location within the GUI occupied by the fixed panel component.

10. The system of claim 1, wherein the fixed panel component is further configured to, in response to the repositioning of the particular navigational component, display the particular navigational component within the fixed panel component, and wherein remaining navigational components of the plurality of navigational components are configured to adjust the predetermined locations thereof based on the repositioning of the respective component.

11. The system of claim 1, wherein the fixed panel component is configured such that when the fixed panel component displays the corresponding plurality of child components of a first navigational component of the plurality of navigational components, a repositioning of a second navigational component of the plurality of navigational components from its corresponding predetermined location within the GUI to the fixed panel component causes a replacement of (i) the corresponding plurality of child components of the first navigational component with (ii) the corresponding plurality of child components of the second navigational component.

12. The system of claim 1, wherein the fixed panel component is configured such that when the fixed panel component displays the corresponding plurality of child components of a first navigational component of the plurality of navigational components, the fixed panel component displays the first navigational component within the fixed panel component, and wherein a repositioning of a second navigational component of the plurality of navigational components from its corresponding predetermined location within the GUI to the fixed panel component is configured to cause (i) the first navigational component to be replaced within the fixed panel component by the second navigational component and (ii) the first navigational component to be returned to its corresponding predetermined location within the GUI.

13. The system of claim 1, wherein the GUI further comprises:
an input field disposed within the fixed panel component and configured to (i) receive textual input and (ii) filter the corresponding plurality of child components based on the textual input.

14. A computer-implemented method comprising:
receiving, from a client device, a request for a graphical user interface (GUI), wherein persistent storage contains definitions of a fixed panel component, an overlay panel component, a plurality of navigational components, and respective pluralities of child components for the navigational components;
in response to the request, obtaining the definitions from the persistent storage and generating a representation of the GUI to include the plurality of navigational components, the overlay panel component, a pin button, and the fixed panel component, wherein the plurality of navigational components are positioned at predetermined locations within the GUI, wherein a particular navigational component is configured to, in response to selection thereof, cause the overlay panel component to display a corresponding plurality of child components arranged according to a corresponding predetermined hierarchy, wherein the fixed panel component is positioned at a further predetermined location within the GUI and configured to, in response to a repositioning of the particular navigational component from its corresponding predetermined location within the GUI to the fixed panel component, display the corresponding plurality of child components as a hierarchical list based on the corresponding predetermined hierarchy, and wherein the pin button is configured to, based on selection of the pin button by way of the client device, toggle the GUI between (i) displaying the corresponding plurality of child components in the overlay panel component and (ii) displaying the corresponding plurality of child components in the fixed panel component; and
transmitting, to the client device, the representation of the GUI.

15. The computer-implemented method of claim 14, wherein the representation of the GUI is generated to further include:
a first layer of the GUI disposed above a second layer of the GUI, wherein the fixed panel component is configured to be displayed in the second layer of the GUI, and wherein the overlay panel component is configured to be displayed in the first layer of the GUI.

16. The computer-implemented method of claim 14, wherein the toggling of the GUI comprises:
hiding the fixed panel component while displaying the corresponding plurality of child components in the overlay panel component; and
hiding the overlay panel component while displaying the corresponding plurality of child components in the fixed panel component.

17. The computer-implemented method of claim 14, wherein the pin button is configured to be display in a pinned conformation as part of the fixed panel component and in an unpinned conformation as part of the overlay panel component.

18. The computer-implemented method of claim 14, wherein the fixed panel component is configured such that when the fixed panel component displays the corresponding plurality of child components of a first navigational component of the plurality of navigational components, a repositioning of a second navigational component of the plurality of navigational components from its corresponding predetermined location within the GUI to the fixed panel component causes a replacement of (i) the corresponding plurality of child components of the first navigational component with (ii) the corresponding plurality of child components of the second navigational component.

19. The computer-implemented method of claim 14, wherein the fixed panel component is configured such that when the fixed panel component displays the corresponding plurality of child components of a first navigational component of the plurality of navigational components, the fixed panel component displays the first navigational component within the fixed panel component, and wherein a repositioning of a second navigational component of the plurality of navigational components from its corresponding predetermined location within the GUI to the fixed panel component is configured to cause (i) the first navigational component to be replaced within the fixed panel component by the second navigational component and (ii) the first navigational component to be returned to its corresponding predetermined location within the GUI.

20. An article of manufacture including a non-transitory computer-readable medium, having stored thereon program instructions that, upon execution by a computing system, cause the computing system to perform operations comprising:

receiving, from a client device, a request for a graphical user interface (GUI), wherein persistent storage contains definitions of a fixed panel component, an overlay panel component, a plurality of navigational components, and respective pluralities of child components for the navigational components;

in response to the request, obtaining the definitions from the persistent storage and generating a representation of the GUI to include the plurality of navigational components, the overlay panel component, a pin button, and the fixed panel component, wherein the plurality of navigational components are positioned at predetermined locations within the GUI, wherein a particular navigational component is configured to, in response to selection thereof, cause the overlay panel component to display a corresponding plurality of child components arranged according to a corresponding predetermined hierarchy, wherein the fixed panel component is positioned at a further predetermined location within the GUI and configured to, in response to a repositioning of the particular navigational component from its corresponding predetermined location within the GUI to the fixed panel component, display the corresponding plurality of child components as a hierarchical list based on the corresponding predetermined hierarchy, and wherein the pin button is configured to, based on selection of the pin button by way of the client device, toggle the GUI between (i) displaying the corresponding plurality of child components in the overlay panel component and (ii) displaying the corresponding plurality of child components in the fixed panel component; and transmitting, to the client device, the representation of the GUI.

\* \* \* \* \*